(12) United States Patent
Levin et al.

(10) Patent No.: US 8,484,181 B2
(45) Date of Patent: *Jul. 9, 2013

(54) CLOUD MATCHING OF A QUESTION AND AN EXPERT

(75) Inventors: Alan Levin, Vancouver (CA); Abhishek Mehrotra, North Brunswick, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/905,011

(22) Filed: Oct. 14, 2010

(65) Prior Publication Data
US 2012/0095977 A1 Apr. 19, 2012

(51) Int. Cl.
*G06F 7/00* (2006.01)
(52) U.S. Cl.
USPC ........... 707/706; 707/731; 707/748; 707/758; 709/201; 709/202
(58) Field of Classification Search
USPC .................. 707/706, 731, 748, 758; 709/201, 709/202, 203
See application file for complete search history.

(56) References Cited

U.S. PATENT DOCUMENTS

| 2003/0028525 A1* | 2/2003 | Santos et al. .................. 707/3 |
| 2005/0108281 A1* | 5/2005 | Kim et al. .................. 707/104.1 |
| 2005/0182743 A1* | 8/2005 | Koenig ............................ 707/1 |
| 2007/0033221 A1* | 2/2007 | Copperman et al. ...... 707/103 R |
| 2010/0070554 A1* | 3/2010 | Richardson et al. .......... 709/202 |

* cited by examiner

*Primary Examiner* — Shew-Fen Lin
*Assistant Examiner* — Jieying Tang
(74) *Attorney, Agent, or Firm* — Stephen M. DeKlerk

(57) ABSTRACT

Methods, systems, apparatus, and machine-readable media for matching a question with an expert are provided herein. Information regarding a plurality of experts may be received. The received information may be analyzed and processed and an expertise cloud may be generated for each expert of the plurality of experts using the received information and results of the analysis and processing. In some cases feedback regarding an expert may be received and associated with the expert. Also disclosed herein is a system, method, apparatus, and machine-readable media for matching an expert with a requested area of expertise.

19 Claims, 18 Drawing Sheets

Expert A

Expertise Cloud A

Question
705

Question Cloud
720

CLOUD MATCHING OF A QUESTION AND AN EXPERT

FIELD OF INVENTION

The present invention relates to systems, methods, apparatus, and computer-readable media for matching a question to one or more appropriate experts.

BACKGROUND

A popular resource on the World Wide Web is the question-and-answer (Q&A) community, where users can post questions on a community website for other community members to answer. There are several designs for this type of website, including open forums where anyone can answer any question and expert forums where experts, self described or otherwise, can answer a posed question.

Assuming a community of experts associated or tagged with areas of known expertise (self-described or inferred), there are several known methods for routing each question asked to the expert or experts best qualified, according to the known routing method, to answer it.

The simplest known routing method is text matching. Text matching typically involves matching text or keywords included in a question to an expertise. A drawback to this approach is that questions are apt to be specific while expertise descriptions are apt to be general. For example, it is difficult to find an expert using text matching to answer the question "How do I hit a sand wedge?" because it is unlikely that an expert would describe his expertise as "sand wedge" or "hitting the sand wedge." Instead, it would be common to find an expert claiming an expertise in "golf".

Thus, use of text matching to route experts to a question has the obvious disadvantage that if a topic or area of expertise truly associated with the question does not literally match the text of the question, the question will be improperly routed to experts in the areas of expertise that literally match the text of the question, not the topic or area of expertise truly associated with the question. "How do I hit a sand wedge?" might be routed to an expert in "sand".

Another known routing method is manual categorization. This routing method typically requires a user to manually categorize a question. For example, a user may categorize a question with keywords that match expertise tags, assign a category or categories to a question, and/or manually select an expert to answer his/her question from a list of experts.

Disadvantages to routing using manual categorization include an expenditure of user time and effort that may greatly exceed the time and effort it takes to simply pose a question. Some questions may be too complex to easily text match or categorize. Such complex questions may require multiple text matching tags or may be difficult for a user to manually categorize and may therefore require additional processing time on the part of the text matching mechanism or user. These burdens may discourage a significant fraction of potential users from using the manual categorization routing system. Furthermore, the additional input provided by unsophisticated users in relation to complex questions may not advance, and may even be detrimental to the advancement of the proper categorization of a complex question.

An alternate scheme employed by some Q&A communities is to auto-categorize a question textually and route it to an expert assigned to that category (where the experts are directly tagged with category titles, or where each expert's tags are also auto-categorized).

A drawback to this approach is that the categories available via auto-categorization tend to be limited in number and broad in scope. Exemplary auto-categorization categories include "law," "sports," and "history." Such broad categories lack the specificity to be accurately matched with a given question and there is a limited likelihood that a given expert's expertise will closely match the question content.

Even if numerous finely-divided categories could be created, populated, and transparently and unambiguously named for ease of selection (editorially or by some automated method), there is no provision for matching a question that falls into two categories to an expert that happens to be proficient in both. For example, the question: "Can I serve Chianti with pasta carbonara?" would ideally be sent to an expert in both "wine" and "Italian food." Under presently available auto-categorization systems, such a question would typically be matched to an expert in either "wine" or "Italian food." Furthermore, under such an auto-categorization system, a weighting system to categorize ambiguous terms would be necessary (e.g., does "bass" in a query imply the "fishing," "music," or "beer and ale" category?).

The present invention discloses a system and method wherein a question posed by a user may be explicitly routed to one or more entities that are presumably "experts" on the topic or topics related to the posed question. One or more of these experts may then respond privately or publicly to the question.

SUMMARY

Methods, systems, apparatus, and machine-readable media for matching a question with an expert are provided herein. Information regarding a plurality of experts may be received. Exemplary received information includes identifying information such as the expert's name, geographic location and contact information. Exemplary received information also includes one or more areas of expertise to be associated with the expert. An expertise cloud may be generated for each expert of the plurality of experts using the received information.

Next, a question may be received from a user. The question may regard any area or topic of interest to the user. A question cloud may be generated for the question. One or more sources of information may then be searched for a match between the expertise clouds and the generated question cloud. Exemplary matches occur when information included in an expertise cloud overlaps with information included in a question cloud.

The found matches may be analyzed according to one or more criteria. Then, a list of ranked matches may be generated based upon the analysis and the list of ranked matches may be transmitted to the user and/or asker of the question.

In some embodiments, the question cloud and/or the expertise clouds may be stored in a database. In other embodiments, the method may further comprise accessing a database that stores a plurality of pre-generated expertise clouds and searching for one or more matches between the pre-generated expertise clouds and the question cloud.

In one embodiment, the generation of an expertise cloud may include analyzing the received information regarding an expert included in the plurality of experts and determining one or more expertise tags related to the received information based on the analysis of the received information and associating the expertise tags with the expert. One or more secondary sources of information may then be searched for one or more items related to the expertise tags associated with the expert. Exemplary secondary sources of information include search engine log data, reference data, editorial data, expert data and expert tag data. The expertise cloud associated with the expert may then be updated in order to incorporate the one or more expertise tags and found related items. In some cases a weight or score for one or more of the expertise tags and/or related items may be calculated and assigned to its respective expertise tag and/or related item. The expertise cloud of the expert may then be updated in order to incorporate the assigned weight of the expertise tag and/or related item.

In some embodiments the generation of a question cloud may include analyzing the question, decomposing the question into one or more components, searching one or more secondary sources of information for one or more items related to the components and updating the question cloud to incorporate the one or more components and related items. In some cases a weight or score for at least one of the one or more components and/or related items may be calculated and assigned to the component or related item, respectively. The question cloud may then be updated in order to incorporate the assigned weight or weights. Again, exemplary secondary sources of information include search engine data, reference data, editorial data, expert data and expert tag data.

In some cases feedback regarding an expert included in the plurality of experts may be received from, for example, a user and/or an expert monitor. The feedback may then be analyzed and associated with at least one of the expert and an expertise cloud associated with the expert based on the analysis.

In some cases, searching for one or more matches between expertise clouds and the question cloud may be based upon one or more weighted conceptual relationships between an expertise cloud and a question cloud.

In one embodiment, analysis of the matches may include determining a number of independent paths or associations between the question cloud and a matching expertise cloud. Each independent path may be associated with a weight. The weight associated with each independent path may be analyzed and the size of the matching cloud may be determined.

In embodiments wherein a portion of the information related to the expert is provided by the expert and/or another individual, additional information regarding the expert may be requested. Additional information may be received in response to the request and the expertise cloud associated with the expert may be updated to include the additional information.

Also disclosed herein is a system, method, apparatus, and machine-readable media for matching an expert with a requested area of expertise. A request from a user to find an expert associated with a topic may be received. A plurality of pre-calculated expertise clouds stored in a database may then be accessed. Each expertise cloud included in the plurality of pre-calculated expertise clouds is associated with an expert. One or more matches may be searched for and one or more matches between the accessed pre-calculated expertise cloud and the topic may then found. The searching for one or more matches may be based upon one or more weighted conceptual relationships between the topic and an expertise cloud.

The matches may be analyzed and a list of ranked matches may be generated based on the analysis. The list of rank matches may then be transmitted to the user. In some cases the request, the matches and/or the generated list of matches may be stored in a database. In some cases, analysis of the matches may include determining a number of independent paths between the topic and a matching expertise cloud. Each independent path may be associated with the weight or score. The weight associated with each path may then be analyzed.

In one embodiment, the topic requested by the user may be analyzed. One or more sources of secondary information may be searched for in order to find items related to the topic. A topic cloud may be generated using the analysis of the topic and the found related items. A match between the pre-calculated expertise clouds and the topic cloud may then be searched for.

In some cases the user may be an expert associated with at least one expertise cloud. The expertise cloud associated with the user expert may be accessed. One or more sources of information may be searched for a match between the accessed pre-calculated expertise clouds and the one or more expertise clouds associated with the user expert. The found matches may then be analyzed and a list of ranked matches may be generated based on the analysis. The list of ranked matches may then be transmitted to the user.

A machine-readable medium as disclosed herein may include a set of instructions executable by a machine which when executed causes the machine to perform any of the methods described herein.

Systems disclosed herein may include a question and expert matching system for receiving information regarding a plurality of experts, generating an expertise cloud for each expert of the plurality of experts, receiving a question from a user, generating a question cloud for the question, searching for one or more matches between the expertise clouds and the questions clouds, analyzing the matches, generating a list of ranked matches based on the analysis, and transmitting the list of ranked matches to the user. Some systems may also include a database for storing at least one of the generated question cloud and the expertise clouds.

BRIEF DESCRIPTION OF THE DRAWINGS

The present application is illustrated by way of example, and not limitation, in the figures of the accompanying drawings in which.

DETAILED DESCRIPTION OF THE DRAWINGS

The present invention includes a cloud matching system and method for routing a question to one or more qualified experts. The systems and methods of the present invention require minimal user involvement beyond the initial posting of the question and do not require question or expert categorization although categorization may be used to supplement the embodiments described herein.

An expert may be, for example, any individual, entity, corporation, governmental agency, etc., with understanding, knowledge, and/or expertise pertaining to, for example, a topic, subject, context, or relationship. An expert need not meet a threshold level of expertise in a given topic in order to be considered an "expert" as referred to herein; however, a degree, or amount of an expert's expertise within a given topic may contribute to that expert being weighted highly and/or preferred over other experts with relatively less expertise with the given topic when an expert is selected to answer a question pertaining to the given topic.

For the sake of brevity and ease of understanding, an expert is referred to herein via the pronouns "his" or "he." It should be understood that use of either of these pronouns does not preclude the possibility, or even likelihood, that an expert is a female individual, or is genderless, as may be the case when the expert is, for example, an entity, company, or governmental agency.

Expertise associated with an expert may be described using various keywords or phrases referred to herein as expertise tags. Even with thousands of experts, and even if each expert is associated with dozens of expertise tags, the total number of unique expertise tags available may be limited. Many questions received from users will have little text, or literal, overlap with this limited set of expertise tags and the systems and methods described herein employ various techniques to mitigate errors caused by, for example, insignificant text, grammar and spelling variations; synonyms; and/or instantiations of broader categories.

Areas of expertise associated with an expert may be described using various keywords or expertise tags, but an incoming question may not match any keywords submitted. Expansion of the expertise areas and the question via clouds of "related items" increases the chance for overlap, and can offer a means to rank experts based on weighted extent of overlap.

In some embodiments, questions and/or experts may be categorized and may be matched when for example, a category associated with a question and an expert or expertise tag is the same. In some cases, a path between a matching question and expert or expertise tag may be weighted or scored more highly when they also share the same category. Similarly, question components or experts/expertise tags that do not match a category associated with a question may be blocked or otherwise filtered from consideration. In some cases, similar categories may not be blocked or filtered.

Figure 1:
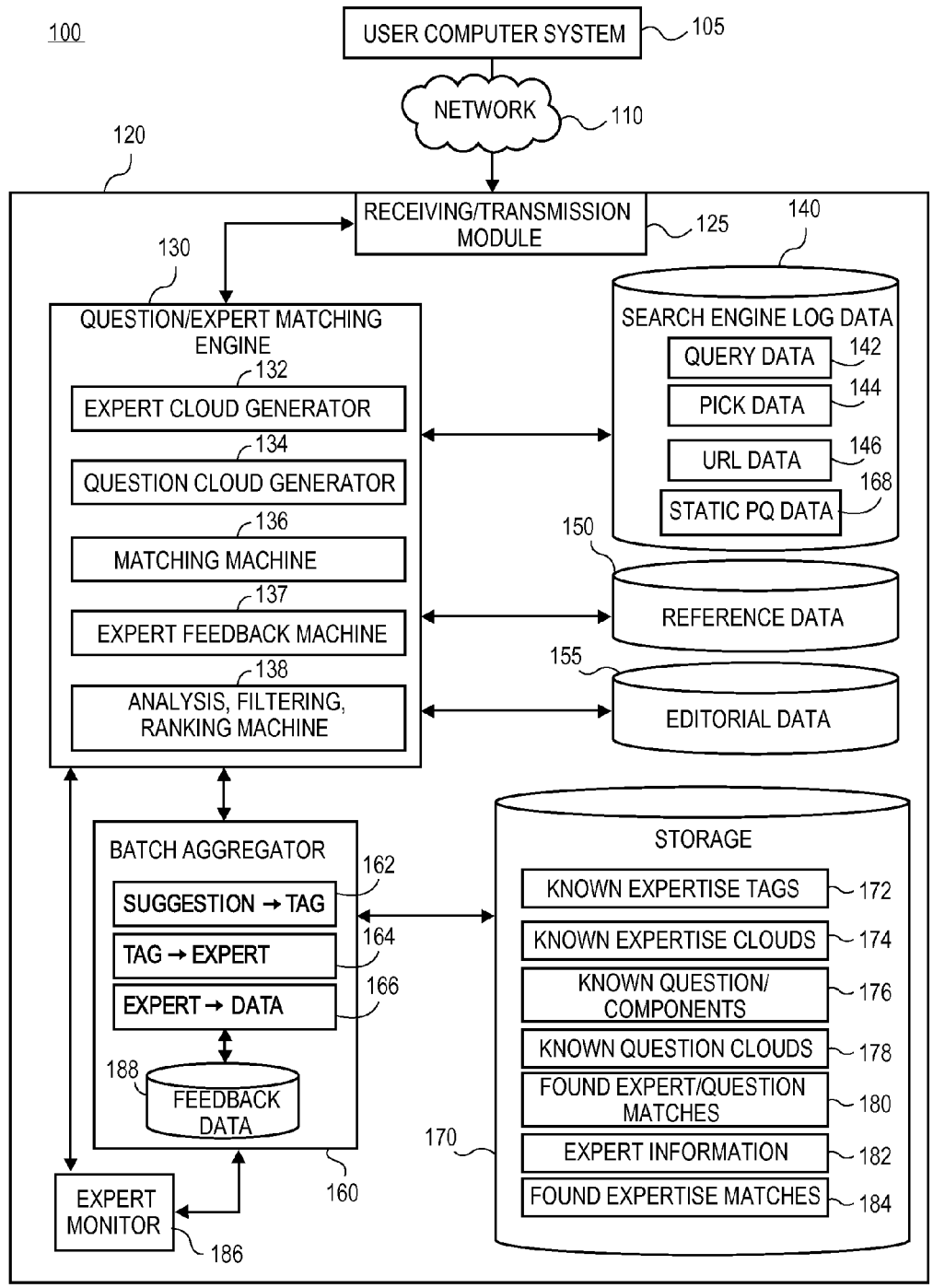
FIG. 1 is a block diagram illustrating an exemplary system for matching a question with one or more experts, in accordance with an embodiment of the present invention.

FIG. 1 illustrates an exemplary system for matching a question and an expert. System 100 includes a user computer system 105, a network 110 and a question and expert matching system 120.

User computer system 105 may be any computer system enabled to communicate with question and expert matching system 120. Further details regarding user computer system 105 are provided below with reference to FIG. 3. Network 110 may be any network enabling communication between user computer system 105 and question and expert matching system 120, such as the Internet, a local area network (LAN), a wireless local area network (WLAN), and/or any other appropriate network.

Question and expert matching system 120 may include a receiving transmission module 125, a question/expert matching engine 130, a search engine log database 140, a database including reference data 150, a database including editorial data 155, data storage 170, a batch aggregator 160, an expert monitor 186 and/or a database including feedback data 188. Although the databases of system 100 are shown within question and expert matching system 120, one or more of the databases may be located outside and be remote to system 100. The data stored in any of the databases of system 100 may be indexed, organized, or otherwise manipulated in order to facilitate, for example, efficient data storage and searching of data.

Question/expert matching engine 130 may include an expert cloud generator 132, a question cloud generator 134, a matching machine 136, an expert feedback machine 137, and an analysis filtering and ranking machine 138. Expert cloud generator 132 may be enabled to generate one or more expertise clouds using, for example, information regarding an expert, expertise tags, and/or related items found in, for example, search engine log database 140, reference data database 150, editorial database 155, and/or storage 170. Question cloud generator 134 may be enabled to generate a question cloud for a question using, for example, components of the question, and/or related items found in, for example, search engine log database 140, reference data database 150, editorial database 155, and/or storage 170.

Matching machine 136 may be enabled to match a question and/or question cloud with one or more experts and/or expertise clouds in accordance with some embodiments of the present invention. Analysis, filtering, and ranking machine 138 may be enabled to analyze, filter and/or rank the one or more matches found by matching machine 136.

Question/expert matching engine 130 is in communication with search engine log database 140. Search engine log database 140 may include, for example, a database including query data 142, a database including pick data 144, and a database including URL data 146.

Exemplary search engine log data included in search engine log database 140 may include databases including millions or, in some cases, for extensive coverage and statistical reliability, billions—of user search sessions.

Exemplary search engine log information includes:
- QP picks—a weighted list of, for example, documents and/or URLs (P) picked by search users in the same session as their entry of a given query (Q);
- QQ queries—a weighted list of queries (Q') entered by search engine users in the same session as their entry of the given query (Q);
- Superqueries—previously logged queries containing a query (Q) presently entered by a user as a substring, or containing all of the words in the presently entered query (Q);
- Subqueries—previously logged queries that include a query (Q) presently entered by a user as one of the substrings included in the presently entered query or containing some of the words in the presently entered query;
- Search results—a weighted list of the documents or URLs returned by a search engine in response to a given query (Q); and
- Qapx data—queries asked in the same session as queries containing components of the incoming question.

The breadth of search engine log data is one of its strengths. Another is the frequency information inherently associated with search engine log data, such as queries or picks, based on the number of users who have formed associations between, for example, queries, and queries and picks. For example, search engine log data may show that "confederate currency" is associated with "confederate paper money" within search sessions about three times as often as with "civil war money." This differentiation in the number of times that "confederate paper money" is associated with "confederate currency" when compared to the number of times "civil war money" is associated with "confederate currency" may be a reflection of the relative proximity of the concepts to one another. Thus, "confederate paper money" can be seen as a closer relative to "confederate currency" than "civil war money" even though "civil war money" is twice as common in overall user queries, as is shown in the Global Frequency column as shown in Table 1 below. The closer relationship may be reflected in the ratio of the Weighted Association to the global frequency.

TABLE 1

| Term associated with "confederate currency" | Weighted Association | Global Frequency |
| --- | --- | --- |
| Confederate paper money | 17.5 | 456 |
| Civil war money | 6.8 | 974 |

Exemplary data included in reference database 150 includes dictionaries, thesauri, and encyclopedias. Such reference data may be used to determine or interpret the meaning, contextual or otherwise, of, for example, an asked question, and/or a term or component included in an asked question. Exemplary interpretations include determining synonyms, spelling and/or term stem variations for components and/or terms included in an asked question.

Exemplary editorial materials included in editorial database include posted resumes, articles available on websites, and text available via a website. For example, information available on NASA's website may be used to determine one or more topical areas in which NASA is an expert. This information may also be used to weight an expert's relative expertise in topical areas or in relation to a particular term or component or type of experience in comparison with other experts. In the example of an individual expert, a search of documents on the World Wide Web may be executed in order to find any and all documents or editorial materials referencing an expert. These documents may be analyzed to, for example, determine weighted areas of expertise for the expert. In some embodiments, some reference materials may be used to expand or increase the specificity of an expert's expertise with terms that are related to his areas of expertise. For example, when an expert describes himself as an electrical engineering expert, various reference materials may be consulted in order to expand and specify the types of experience that would be common to electrical engineering experts.

Question/expert matching engine 130 is also in communication with a database including reference data 150 and a database including editorial data 155.

Question/expert matching engine 130 is also in communication with storage 170. Storage 170 may include a database of known expert tags 172, a database of known expertise clouds 174, a database of known question components 176, a database of known question clouds 178, a database of found expert/question matches 180, a database of expert information 182, and/or a database of found expertise matches 184. Although databases 172-184 are depicted in FIG. 1 as being in one centralized storage location, storage 170, this data may be stored in numerous databases located within system 100 and/or outside system 100 yet still in communication with system 100.

Question/expert matching engine 130 is also in communication with batch aggregator 160. Batch aggregator 160 includes a suggestion to tag relationship database 162, a tag to expert relationship database 164, an expert to expert data relationship database 166 and a static pick/query (PQ) data database 168. Batch aggregator 160 may aggregate data for an expert, expertise tags associated with an expert, suggested expertise tags.

Suggestion to tag relationship database 162 may include one or more suggested areas of expertise or suggested expertise tags that are associated with an expertise tag. Tag to expert relationship database 164 may include an identifying information for an expert associated with an expertise tag, the size of an expertise cloud associated with an expert, a global popularity score of the expertise tag among, for example, search engine users, and/or a string including the expertise tag.

Expert to expert data relationship database 166 may contain expert identifying information for each expert as well as performance metrics to enhance the routing of questions to an expert. Exemplary expert identifying information stored in expert to data relationship database 166 includes the location, age, gender, and/or expertise cloud size of an expert. Expert to expert data relationship database 166 may also include lists of expertise tags associated with various experts, and performance metrics associated with various experts, and/or feedback information associated with various experts. Static PQ database 168 may include one or more pick and query associations.

Expert monitor 186 may monitor an expert's performance including, for example, an expert's response time when answering a question, the thoroughness of an answer to a question, and feedback regarding an expert. A database including feedback data 188 may include feedback data related to one or more experts, expertise tags, and/or expertise clouds.

Figure 2:
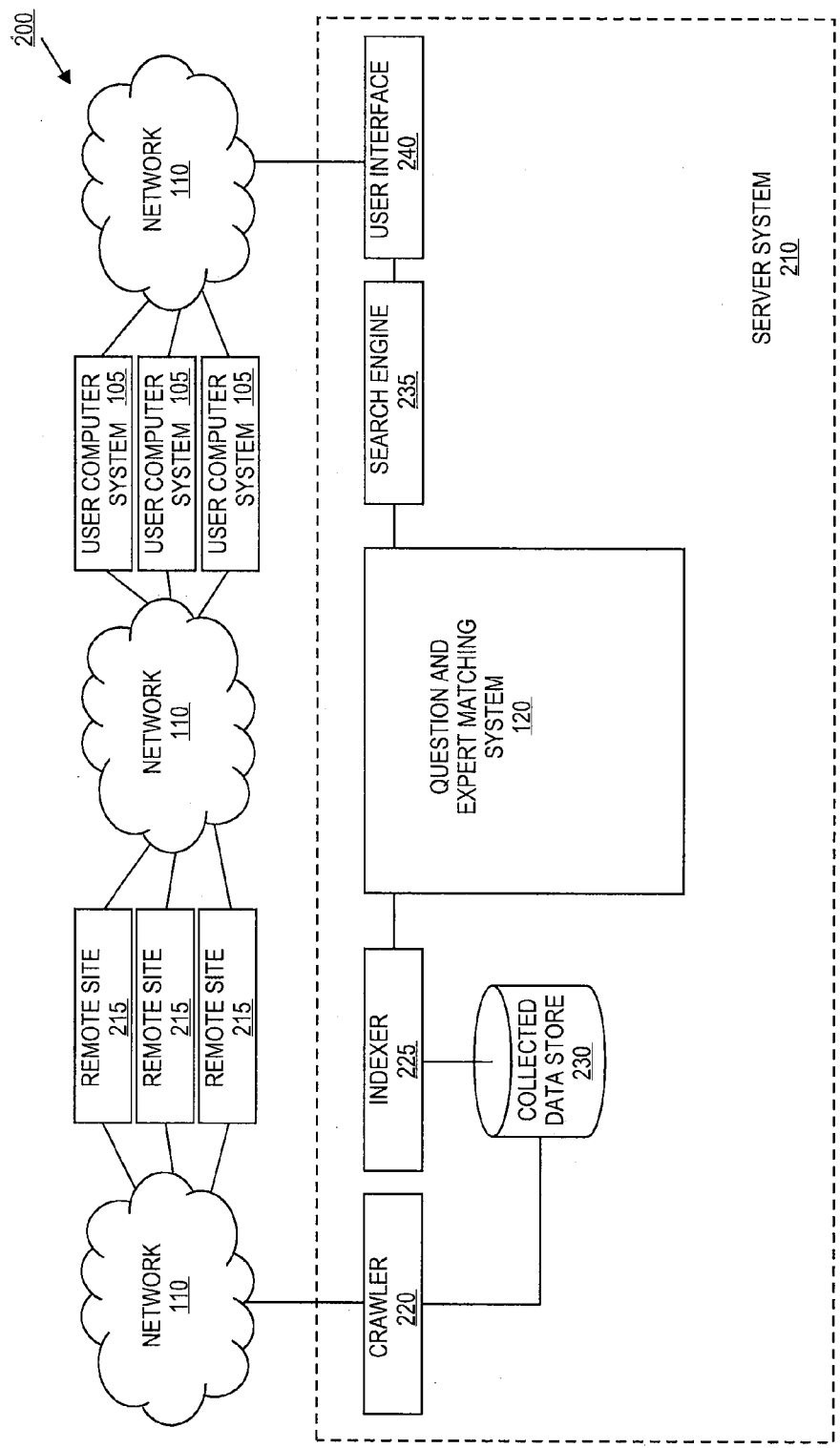
FIG. 2 is a block diagram illustrating an exemplary network environment for matching a question with one or more experts, in accordance with an embodiment of the present invention.

FIG. 2 of the accompanying drawings illustrates an exemplary network environment 200 that includes networks 110, a plurality of remote sites 215, a plurality of user computer systems 105, and a server computer system 210. One or more of the plurality of remote sites 215 may be associated with an expert.

Server computer system 210 has stored thereon a crawler 220, a collected data store 230, an indexer 225, question and expert matching engine 120, a search engine 235, and user interface 240. Crawler 220 is connected over network 110 to remote sites 215. Collected data store 230 is connected to crawler 220, and indexer 225 is connected to collected data store 230. Question and expert matching engine 120 is connected to indexer 225. Search engine 235 is connected to question and expert matching engine 120. User computer systems 105 may be located at, for example, respective client sites and are connected over network 110 and user interface 240 to search engine 235.

Crawler 220 may periodically access remote sites 215 over network 110. Crawler 220 collects data from remote sites 215 and stores the data in collected data store 230. Indexer 225 indexes the data in collected data store 230 and stores the indexed data in question and expert matching engine 120.

A user at one of user computer systems 105 may access user interface 240 over network 110. The user may enter a question in a search or question box in user interface 240, and either hit "Enter" on a keyboard or select a "Search" button or a "Go" button of user interface 240. Search engine 235 may then use the question to parse data stored in question and expert matching engine 120.

Search engine 235 may then transmit the extracted data or expert match over network 110 to a user computer system 105. The extracted data or expert match may include a list of experts and/or URL links to one or more of remote sites 215. The user at user computer system 105 may select one of the links to remote sites 215 and access respective remote site 215 over network 110. Server computer system 210 may thus assist the user at the respective user computer system 105 to find or select an expert and/or one of remote sites 215 that have data pertaining to the question entered by the user.

Figure 3:
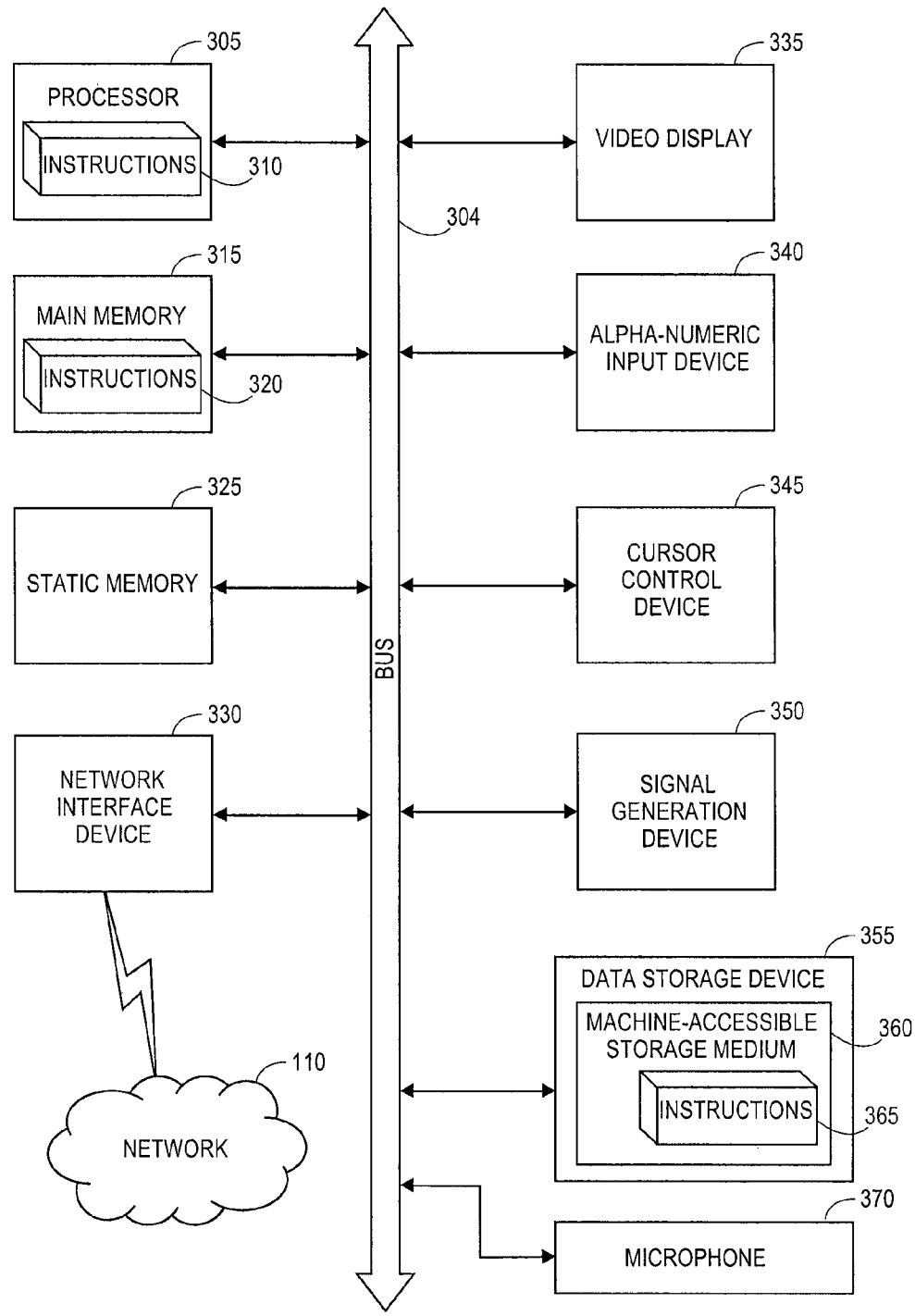
FIG. 3 is a block diagram illustrating a machine in the exemplary form of one or more user computer systems, in accordance with an embodiment of the present invention.

FIG. 3 is a block diagram of a machine in the exemplary form of one of user computer systems 105 within which a set of instructions 310 and 320, for causing machine 105 to perform any one or more of the methodologies discussed herein, may be executed. In alternative embodiments, machine 105 operates as a standalone device or may be connected (e.g., network) to other machines. In a network deployment, machine 105 may operate in the capacity of a server or a client machine in a server-client network environment, or as a peer machine in a peer-to-peer (or distributed) network environment. Machine 105 may be, for example, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term (machine) shall also be taken to include any collection of machines that individually or jointly execute a set (or multiple sets) of instructions to perform any one or more of the methodologies discussed herein. Server computer system 210 of FIG. 2 may also include one or more machines as shown in FIG. 3.

Exemplary user computer system 105 includes a processor 305 (e.g., a central processing unit (CPU), a graphics processing unit (GPU), or both), a main memory 315 (e.g., read-only memory (ROM), flash memory, dynamic random access memory (DRAM) such as synchronous DRAM (SDRAM) or Rambus DRAM (RDRAM), etc.), and a static memory 325 (e.g., flash memory, static random access memory (SRAM), etc.), which communicate with each other via a bus 304.

User computer system 105 may further include a video display 335 (e.g., a liquid crystal display (LCD) or a cathode ray tube (CRT)). User computer system 105 also includes an alpha-numeric input device 340 (e.g., a keyboard), a cursor control device 345 (e.g., a mouse or trackpad), a data storage device 355, a signal generation device 350 (e.g., a speaker), a microphone 370, and a network interface device 330.

Data storage device 335 includes a machine-readable medium 360 on which is stored one or more sets of instructions 365 (e.g., software) embodying any one or more of the methodologies or functions described herein. Set of instructions 365 may also reside, completely or at least partially, within main memory 315 and/or within processor 305 during execution thereof by user computer system 105, static memory 325 and processor 305 also constituting machine readable media. Set of instructions 365 may further be transmitted or received over a network 110 via network interface device 330.

While set of instructions 365 are shown in an exemplary embodiment to be on a single medium, the term "machine readable medium" should be taken to include a single medium or multiple media (e.g., a centralized or distributed database or data source and/or associated caches and servers) that store the one or more sets of instructions 365. The term "machine readable medium" shall also be taken to include any medium that is capable of storing, encoding, or carrying a set of instructions for execution by machine 105 and that caused machine 105 to perform any one or more of the methodologies of the present invention. The term "machine readable medium" shall accordingly be taken to include, but not be limited to, solid-state memories, and optical, and magnetic media.

Figure 4:
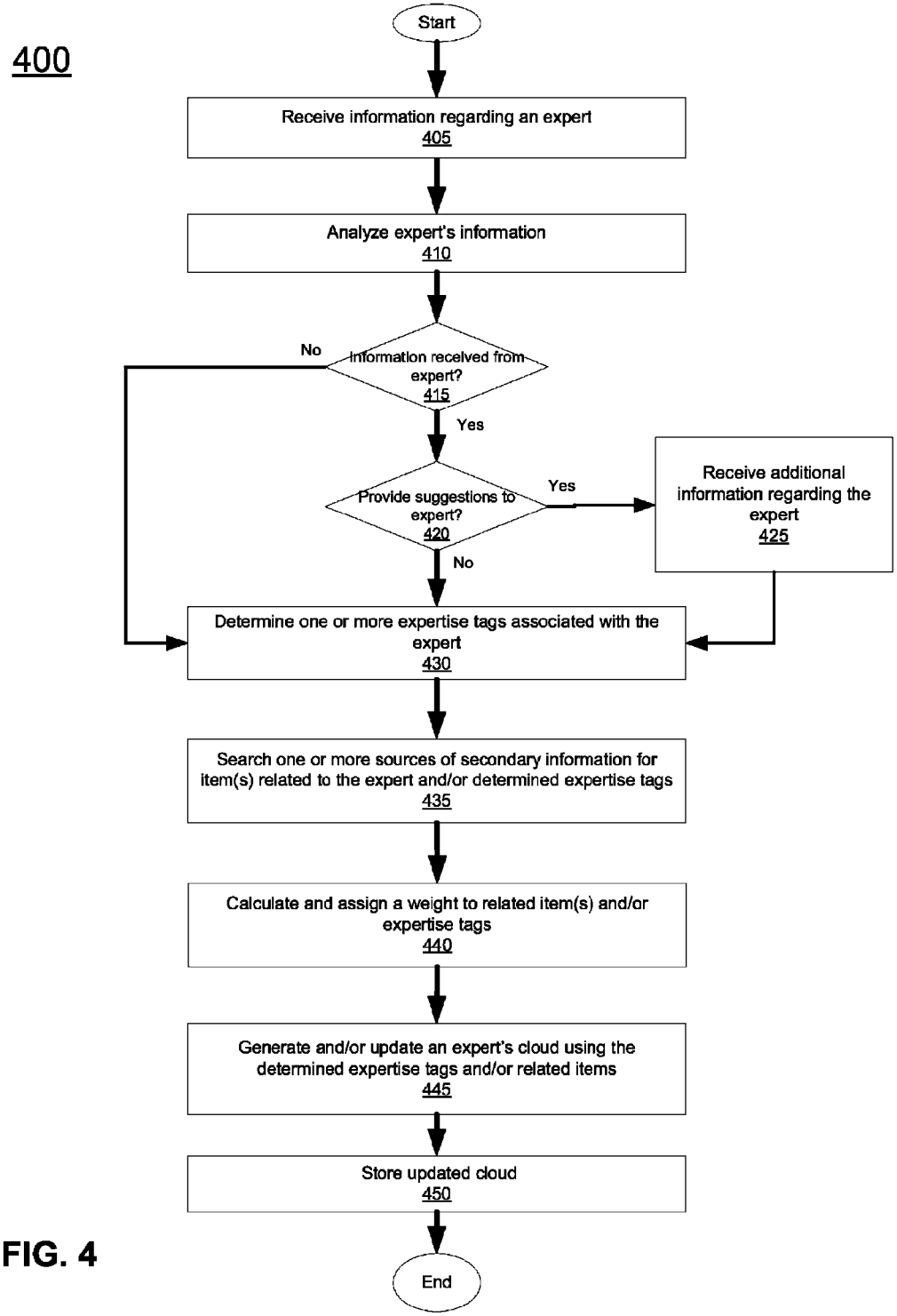
FIG. 4 is a flow chart illustrating an exemplary process for generating and/or updating an expertise cloud, in accordance with an embodiment of the present invention.

FIG. 4 illustrates an exemplary process 400 for generating and/or updating an expertise cloud. Process 400 may be executed by, for example, systems 100, 200, 300, and/or any combination thereof.

In step 405, information regarding an expert is received. This information may be received from, for example, the expert directly, the expert indirectly, and/or a third party via any appropriate means, for example, written and/or oral communication.

Information may be received directly from the expert when, for example, the expert submits, for example, one or more documents, sentences, phrases, and/or terms to describe his or her areas of expertise.

Entry of expertise tags may include, for example, an expert self-defining his expertise in his own words while selection of expertise tags may include, for example, an expert's selection of expertise tags from a provided list of known expertise tags. In some cases, both the entry of self-defined expertise tags and the selection of relevant expertise tags from a list of known expertise tags may be used in combination with one other. In these cases, an expert may select a number of known expertise tags and then enter one or more self-defined expertise tags in, for example, an "other" category or dialog box.

For example, an expert may directly provide information regarding his expertise in the topics of coin collecting, rare coins, and confederate currency by entering the phrases "coin collecting," "rare coins," and "confederate currency," selecting the expertise tags "coin collecting," "rare coins," and "confederate currency" from a provided list of known expertise tags, submitting one or more documents describing his expertise in coin collecting, rare coins, and/or confederate currency, and/or by entering the sentences "I have expertise in coin collecting. I also have expertise in rare coins and confederate currency."

The specificity and amount of information received regarding an expert may have implications for an expertise cloud that may eventually be generated using the information and/or an eventual match of the expertise cloud with a question. Further details regarding both of these processes are provided below.

In one embodiment, information regarding an expert may be received via a third party, such as a crawler like crawler 220, via an automatic procedure for accessing an expert's information on, for example, the World Wide Web either with or without the expert's prior express request that the third party access his information. For example, information regarding the expert NASA may be received from a third party following the third party's access of NASA's website and/or URLs including information regarding NASA and subsequent analysis of the information found there.

In step 410, the expert's information may be analyzed in order to determine, for example, an identity of the expert, an area of expertise to be associated with the expert, ambiguous or inconsistent information included in the expert's received information, the specificity of the information, and/or the quantity of the received information. The expert's information may be analyzed using one or more language rules and/or natural language rules.

In step 415, it may be determined whether the expertise information is received from an expert. When the expertise information is received from an expert, it may be determined whether to provide one or more suggested areas of expertise and/or expertise tags to the expert (step 420). The determination of step 420 may be based upon, for example, the analysis of step 410.

The suggested expertise tags may be provided to an expert, for example, in response to his initially entered information and/or selected expertise tags. The suggested expertise tags may be supplied from sources, such as batch aggregator 160 and/or suggestion to tag relationship database 162 and/or text auto-completion when typing and may include related searches and/or related expertise tags. In some cases, the suggested expertise tags provided to an expert may be selected such that they relate to only one, or a few, targeted topics. Suggested expertise tags may also be provided to an expert so that a selection of one or more of the suggested expertise tags by the expert removes a degree of ambiguity from an expert's initially entered information. Suggested expertise tags may further be provided to an expert in order to increase the specificity and/or quantity of information associated with the expert.

In one embodiment, a set of suggested expertise information and/or tags are formed by manipulating a group of expertise tags associated with known experts with expertise related to the information received in step 405. A determination that the expertise of a known expert is related to that of the expert may be made based on, for example, the analysis of step 410.

Experts may freely describe multiple areas of expertise, but those areas of expertise that become associated by multiple experts far more than would be randomly expected will tend to be closely related to one another. The expertise tags associated or grouped by each expert may be paired off, and the number of experts who have independently created such pairs may be counted. Those pairs that exceed a minimal co-occurrence threshold and widely exceed the expected co-occurrence frequency are likely related and may be classified as a group of expertise tags such that when one expertise tag is associated with an expert, other expertise tags included in the group are provided as suggested expertise tags. One or more groups of expertise tags may be stored in, for example, batch aggregator 160, suggestion to tag relationship database 162, and/or storage 170.

Table 2 provides a list of search suggestions and expertise tag suggestions associated with the expertise area and/or tag "ajax" that are popular among, for example, search engine users that may be provided to an expert as suggested expertise tags. The popular search suggestions represent popular search terms that are associated with the expertise "ajax" that may be suggested to an expert when he provides "ajax" as an area of expertise and/or expertise tag associated with him. The popular expertise tags represent popular expertise tags that are associated with the expertise "ajax" that may be suggested to an expert when he provides "ajax" as an area of expertise and/or expertise tag associated with him.

When comparing the popular search suggestions and popular expertise tags for the expertise "ajax" it can be seen that the search suggestions are relatively unfocused regarding different senses of "ajax," and several among them would make poor expertise descriptions. In contrast, the popular expertise tags focus on computing languages, and describe other areas of expertise that experts in the ajax computing language often share. Thus, the popular expertise tags are more useful suggestions for an expert desiring to expand the areas of expertise associated with him.

TABLE 2

| Expertise = "Ajax" | |
| --- | --- |
| Popular Search Suggestions | Popular Expertise Tags |
| ajax Greek | JavaScript |
| ajax cleaner | db2 |
| ajax football club | java |
| ajax Amsterdam | jsp |
| ajax and mythology | sql |
| ajax programming | apache |
| Achilles | tomcat |
| what is ajax | xml |

Additional information regarding the expert may be received (step 425) in response to the one or more suggestions provided to the expert in step 420. Exemplary additional information includes the selection of one or more suggested expertise tags to be associated with the expert and/or the entry of freeform information regarding the expert.

When additional information is received from the expert (step 425), suggestions are not provided to the expert (step 420), and/or the information is not received from the expert (step 415), a determination of one or more expertise tags to be associated with the expert may be performed (step 430).

Figure 5A:
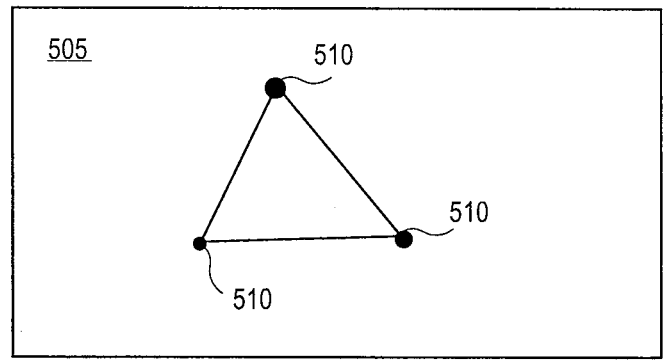
FIG. 5A is a diagram illustrating an exemplary graphic depiction of expertise tags associated with an expert, in accordance with an embodiment of the present invention.

FIG. 5A illustrates an exemplary graphic depiction of the expertise of an expert A 505 where the expertise tags associated with the expert A 505 are represented as expertise tags 510 and the paths between expertise tags 510 are shown as lines connecting expertise tags 510. The relative sizes of expertise tags 510 serve to indicate the relative importance, or weight, of the expertise tag to the expertise associated with the expert.

In step 435, one or more sources of secondary information may be searched for information relating to the expert and/or expertise tags associated with the expert. Such related information may be referred to herein as a "related item." Exemplary sources of secondary information include data stored in batch aggregator 160, search engine log data, reference data, and editorial data, such as search engine log data 140, reference data 150, and editorial data 155, respectively.

Once found, related items may be analyzed and/or mathematically manipulated in order to, for example, determine the related item's relevancy to an area of expertise and/or expertise tag and/or popularity among, for example, search engine users. Popular related items may include terms or concepts that are, for example, frequently used to describe an area of expertise, are frequently asked about via user submitted queries and/or are frequently selected as a pick by search engine users.

In some cases, related items may be weighted according to one or more criteria, such as relevancy and/or popularity, such that related items that are strongly related to an expertise tag may be weighted higher than other related items that are relatively weakly related to the expertise tag. Likewise, related items that are relatively more popular may be weighted more highly than relatively unpopular related items.

Lists of picks and terms, either of which may be an expertise tag or a related item, correlated with given previously submitted query terms may be stored in a search log. In some embodiments, the entries included in the correlated list may be ranked or ordered by association count, for example, the number of times a term is associated with a pick and vice versa.

At times, ambiguous terms or concepts may accumulate expertise tags or related items. For example, a term like "depression" may link to concepts in both psychology and economics. However, ambiguous terms, especially when considered in combination with other terms, may be useful expertise tags or related information. For example, "depression" may not distinguish between experts in economics and psychology, but it does distinguish these experts from those in a host of unrelated subjects such as baseball, knitting, or astronomy. Furthermore, a collection of two or more individually ambiguous terms may become quite unambiguous. For example, "stock" could refer to ranching or finance, but a question associated with "stock" and "depression" is unlikely to be about either ranching or psychology and very likely to imply a financial context, as that is the topic or concept the terms primarily share.

Possible ways of using search engine log data stored in, for example, search engine log database 140, to locate information or concepts related to an expert or expertise tag are to associate queries (Q) previously entered by a search engine user and/or search results that are selected or picked (picks (P)) from a list of search results presented to a user in response to a specific query wherein at least one of the query (Q) and pick (P) are conceptually related to an expertise tag. Picks are typically URL addresses while queries are typically composed of strings, terms, keywords, and/or tags.

One type of association available via a search engine log data is a query-query (QQ) association. In a QQ association, two queries that are asked in the same searching session of a user are associated in a search engine log. The association may be stored in, for example, search engine log database 140 within a query database like query database 142. A search session may be, for example, a period of time a user is online, searching for a particular topic, using a web browser, and/or using a search engine. A search session may be of any duration and in some cases, may be automatically terminated when, for example, a threshold time period of inactivity by the user occurs. When generating an expertise cloud, a search engine log may be searched for one or more QQ related to one or more expertise tags associated with a given expert. Results of this search may be used to expand the areas of expertise associated with the expert and generate an expertise cloud for the expert.

Another type of association available via a search engine log data is a query-pick-query (QPQ) association. In a QPQ association, two different queries entered by two users, or the same user at different times, are associated with a pick that was selected from a list of search results provided in response to one or both of the queries. In other words, a QPQ association exists when a single pick is chosen from the search results provided in response to two different queries. On some occasions, a QPQ association may occur when one user enters a query, picks a search result returned to the user in response to the query, and then submits a subsequent query.

Searching for queries related to an expertise tag provides advantage of diagnostic clarity as it is fairly easy to inspect a set of terms, phrases, expertise tags, etc. included in a query in order to determine whether they are relevant to the topic or area of expertise at issue, especially when it is composed of familiar terms, as opposed to the URL addresses commonly associated with picks. Searching for picks related to an expertise tag and/or an expert offers the advantage of reduced ambiguity in comparison with a query's terms, phrases, expertise tags, etc., as a URL is rarely ambiguous. However, on some occasions, picks may be generic or overly broad as in the case of a super-popular website like a portal.

Table 3 below illustrates a difference in the results generated by the QQQ association method and the QPQ association method when a related item associated with the expertise tag is ambiguous. In the example of Table 3, the expertise tag is "iPhone." As is commonly known in the art, an iPhone is a mobile telephone distributed by Apple Computer, Inc™. However, "apple" is an ambiguous term because it represents two or more unrelated concepts (e.g. fruit and consumer electronics) that happen to share a common name.

When searching for a related item associated with the expertise tag "iPhone" via QQQ, a query including the term "pear" may be found to match the related item "apple" which is in turn associated with the expertise tag "iPhone" because "apple" is closely related to query term "pear" when the subject is fruit. In this way, a query term "pear" is incorrectly associated to an expertise tag, in this case "iPhone," through an ambiguous term via the QQQ association method.

This problem is unlikely to occur via the QPQ association method, as a QPQ association is unlikely to link the term "apple" and "pear" in association with the expertise tag "iPhone." For such a situation to arise in QPQ, a single webpage or URL would need to have been picked both by users submitting a query including "pear" and users submitting a query including "iPhone". This would be unusual, as an authoritative webpage addressing both concepts is unlikely to exist. However, even if such a relationship path were established, it would almost certainly be due to generic noise and represent a much lower scoring relationship than the QQQ path discussed above.

TABLE 3

| Match Method | Query Term | Related Item Associated with Expertise Tag | Expertise Tag |
|---|---|---|---|
| QQQ | pear | apple | iPhone |
| QPQ | pear | none found | iPhone |

On some occasions, such as, for example, for rare or unpopular queries, a search of QQQ data may provide deeper coverage for an expertise tag than a search of QPQ data. Of course, the two methods can be used in combination.

In step 440, a weight may be calculated and assigned to one or more found related items and/or paths between a related item and an expertise tag based on, for example, the strength of the relationship between the related item and the expertise tag. Several other quantities may be used to determine the weight of a relationship between an expertise tag and the related concept or information. These weighted terms or picks may be used to generate expertise clouds as in step 445. Further details regarding the process of step 440 are provided below with reference to FIGS. 9-12

Table 4 provides an table of exemplary related items for the expertise tags "astronauts," "NASA," and "space flight" wherein the related items are found via a QQ association. Table 4 also includes a column indicating the frequency of use for the related item among search engine users and the relative weight of related items.

The related items are listed in order of highest to lowest weight. The weight and the inverse frequency of the related item may contribute to the value of each question-component-to-expertise-tag path as discussed below with regard to step 1125 of FIG. 11. Some related items, such as "planets" in this example, may be associated with more than one expertise tag. In Table 4, "planet" is associated with the expertise tags of NASA, astronauts, and space travel.

TABLE 4

| Expertise Tag | Frequency | Related Item | Weight |
|---|---|---|---|
| NASA | 105067 | NASA | 105067.0 |
| astronauts | 10855 | astronauts | 10855.0 |
| space travel | 8218 | space travel | 8218.0 |
| NASA | 105067 | NASA home page | 2684.2 |
| NASA | 105067 | what does NASA stand for | 1611.8 |
| NASA | 105067 | NASA kids | 1457.8 |
| NASA | 105067 | NASA history | 1340.7 |
| NASA | 105067 | space | 1048.8 |
| NASA | 105067 | NASA space station | 713.0 |
| NASA | 105067 | space shuttle | 679.8 |
| NASA | 105067 | NASA website | 592.8 |
| astronauts | 10855 | famous astronauts | 576.4 |
| NASA | 105067 | NASA timeline | 532.3 |
| NASA | 105067 | Mars | 492.5 |
| NASA | 105067 | planets | 454.9 |
| space travel | 8218 | space travel history | 441.5 |
| NASA | 105067 | astronomy | 427.1 |
| NASA | 105067 | space NASA | 408.0 |
| NASA | 105067 | space exploration | 401.7 |
| NASA | 105067 | solar system | 379.3 |
| NASA | 105067 | NASA photos | 309.1 |
| space travel | 8218 | space | 297.5 |
| NASA | 105067 | NASA pictures | 289.2 |
| NASA | 105067 | facts about NASA | 286.6 |
| space travel | 8218 | space exploration | 270.3 |
| NASA | 105067 | what is NASA | 251.2 |
| NASA | 105067 | Earth | 243.7 |
| NASA | 105067 | International Space Station | 239.3 |
| space travel | 8218 | future space travel | 237.4 |
| NASA | 105067 | Neil Armstrong | 234.2 |
| astronauts | 10855 | space astronauts | 232.8 |
| astronauts | 10855 | names of astronauts | 225.8 |
| NASA | 105067 | NASA.com | 216.9 |
| space travel | 8218 | space travel NASA | 214.7 |
| astronauts | 10855 | NASA astronauts | 213.6 |
| NASA | 105067 | n.a.s.a. | 211.5 |
| NASA | 105067 | moon | 199.8 |
| NASA | 105067 | Kennedy space center | 188.3 |
| space travel | 8218 | space travel timeline | 184.4 |
| NASA | 105067 | NASA stands for | 183.4 |
| NASA | 105067 | Hubble | 175.9 |
| NASA | 105067 | Jupiter | 168.3 |
| NASA | 105067 | history of NASA | 165.4 |
| NASA | 105067 | Pluto | 165.1 |
| NASA | 105067 | google | 164.1 |
| NASA | 105067 | NASA.gov | 158.7 |
| NASA | 105067 | Saturn | 152.0 |
| NASA | 105067 | NASA logo | 151.4 |
| astronauts | 10855 | astronaut | 143.6 |
| astronauts | 10855 | astronaut biographies | 133.4 |
| NASA | 105067 | Hubble Telescope | 129.1 |
| space travel | 8218 | history of space travel | 128.6 |
| NASA | 105067 | Apollo 11 | 128.5 |
| NASA | 105067 | Venus | 126.4 |
| NASA | 105067 | NASA Mars | 123.6 |
| NASA | 105067 | Sputnik | 120.9 |
| astronauts | 10855 | Neil Armstrong | 120.3 |
| space travel | 8218 | outer space | 114.0 |
| NASA | 105067 | NASA for kids | 113.8 |
| NASA | 105067 | Neptune | 112.0 |
| NASA | 105067 | Rockets | 105.6 |
| NASA | 105067 | Stars | 105.2 |
| NASA | 105067 | black holes | 103.8 |
| NASA | 105067 | Uranus | 103.3 |
| NASA | 105067 | satellite images | 103.1 |
| space travel | 8218 | NASA | 102.2 |
| NASA | 105067 | outer space | 100.4 |
| NASA | 105067 | NASA space centers | 99.3 |
| astronauts | 10855 | list of astronauts | 97.6 |
| NASA | 105067 | National Aeronautics and Space Administration | 97.3 |
| NASA | 105067 | astronauts | 97.2 |
| astronauts | 10855 | NASA | 95.5 |
| NASA | 105067 | sun | 95.1 |
| NASA | 105067 | astronauts NASA | 94.6 |
| astronauts | 10855 | pictures of astronauts | 94.4 |
| NASA | 105067 | what does NASA mean | 93.2 |
| NASA | 105067 | Apollo 13 | 91.2 |
| NASA | 105067 | Mercury | 85.2 |
| NASA | 105067 | NASA rocket | 84.4 |
| space travel | 8218 | hazards traveling into space | 84.2 |
| NASA | 105067 | space shuttles | 84.0 |
| astronauts | 10855 | names of all famous astronauts | 83.2 |
| space travel | 8218 | space shuttle | 82.9 |
| NASA | 105067 | NASA space center | 82.6 |
| NASA | 105067 | NASA facts | 81.6 |
| NASA | 105067 | NASA photo | 77.0 |
| NASA | 105067 | NASA official website | 76.5 |
| astronauts | 10855 | astronauts information | 76.0 |
| NASA | 105067 | comets | 75.9 |
| NASA | 105067 | NASA Columbia | 75.4 |
| NASA | 105067 | satellites | 74.5 |
| NASA | 105067 | the Moon | 74.1 |
| NASA | 105067 | NASA space shuttle | 73.6 |
| NASA | 105067 | Area 51 | 73.6 |
| astronauts | 10855 | space | 73.2 |
| NASA | 105067 | FBI | 73.0 |
| NASA | 105067 | NASA jobs | 72.1 |
| NASA | 105067 | CIA | 71.1 |
| NASA | 105067 | space pictures | 70.4 |
| NASA | 105067 | what is the mission statement of NASA | 70.3 |
| NASA | 105067 | NOAA | 69.7 |
| NASA | 105067 | space station | 69.1 |
| NASA | 105067 | Wikipedia | 67.6 |
| NASA | 105067 | NASA space history | 67.0 |
| NASA | 105067 | astronaut | 66.3 |
| astronauts | 10855 | Space Shuttle | 65.6 |
| NASA | 105067 | UFO | 65.6 |
| NASA | 105067 | NASA astronauts | 64.7 |
| astronauts | 10855 | information on astronauts | 64.5 |
| NASA | 105067 | NASA rockets | 63.9 |
| NASA | 105067 | space travel | 63.5 |
| NASA | 105067 | CNN | 63.3 |
| NASA | 105067 | what future plans does NASA have | 63.3 |
| NASA | 105067 | Yahoo | 62.6 |
| NASA | 105067 | when was the last space shuttle launch | 62.6 |
| NASA | 105067 | Challenger | 62.2 |
| NASA | 105067 | SETI | 61.6 |
| NASA | 105067 | constellations | 61.4 |
| NASA | 105067 | NASA www.NASA.gov | 59.8 |
| NASA | 105067 | Apollo | 58.7 |
| NASA | 105067 | aliens | 58.1 |
| NASA | 105067 | galaxy | 56.0 |

TABLE 4-continued

| Expertise Tag | Frequency | Related Item | Weight |
|---|---|---|---|
| NASA | 105067 | NASA space rockets | 55.8 |
| NASA | 105067 | science | 55.4 |
| NASA | 105067 | NASA space program | 55.2 |
| astronauts | 10855 | astronaut requirements | 54.3 |
| NASA | 105067 | the sun | 54.3 |
| astronauts | 10855 | astronauts in space | 54.1 |
| NASA | 105067 | acronym NASA stand for | 53.9 |
| NASA | 105067 | lunar eclipse | 53.3 |
| space travel | 8218 | future in space travel | 52.9 |
| astronauts | 10855 | astronaut training | 51.3 |
| astronauts | 10855 | about astronauts | 50.7 |
| astronauts | 10855 | become astronaut | 50.4 |
| astronauts | 10855 | Apollo astronauts | 50.3 |
| astronauts | 10855 | astronaut in space | 49.0 |
| astronauts | 10855 | moon | 46.9 |
| space travel | 8218 | space tourism | 45.7 |
| space travel | 8218 | time travel | 44.5 |
| space travel | 8218 | space rockets | 44.3 |
| astronauts | 10855 | space travel | 42.2 |
| space travel | 8218 | astronauts | 41.9 |
| astronauts | 10855 | what do astronauts do | 40.8 |
| space travel | 8218 | timeline space travel | 40.8 |
| space travel | 8218 | solar system | 40.1 |
| astronauts | 10855 | John Glenn | 39.6 |
| astronauts | 10855 | planets | 39.1 |
| space travel | 8218 | planets | 38.0 |
| space travel | 8218 | future space travel technology | 34.8 |
| astronauts | 10855 | space exploration | 33.3 |
| astronauts | 10855 | astronauts on the moon | 19.2 |
| astronauts | 10855 | astronaut pictures | 19.0 |
| space travel | 8218 | space technology | 18.4 |
| space travel | 8218 | moon | 18.2 |
| astronauts | 10855 | astronomers | 18.1 |
| space travel | 8218 | first man on the moon | 18.0 |
| astronauts | 10855 | biographies of NASA astronauts | 17.8 |
| space travel | 8218 | astronomy | 17.8 |
| astronauts | 10855 | space pictures | 17.6 |
| astronauts | 10855 | what do astronauts eat | 17.6 |
| space travel | 8218 | spacetravel | 17.6 |
| astronauts | 10855 | how to become an astronaut | 17.2 |
| space travel | 8218 | space shuttles | 17.1 |
| space travel | 8218 | space exploration timeline | 17.1 |
| space travel | 8218 | the history of space travel | 17.1 |
| space travel | 8218 | spaceships | 17.0 |
| astronauts | 10855 | astronauts names | 16.7 |

Figure 5B:
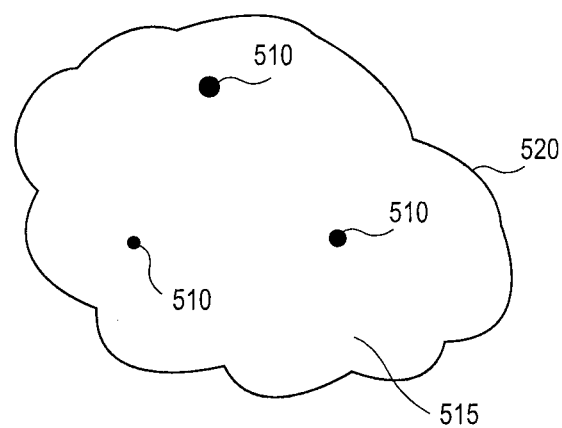
FIG. 5B is a diagram illustrating an exemplary graphic depiction of an expertise cloud, in accordance with an embodiment of the present invention.

In step 445, an expertise cloud may be generated and/or updated using, for example, the found related items and/or expertise tags associated with the expert. FIG. 5B illustrates an exemplary expertise cloud A 520 for expert A 505 that includes expertise tags 510 and found related items 515. Related items 515 are shown in FIG. 5B as the space included within expertise cloud A 520. In step 450, the expertise cloud may be stored in, for example, storage 170 and/or known expertise cloud database 174 and process 400 may end.

In some embodiments, especially where speed is at a premium, QQQ or QPQ analysis and/or expert cloud production may be accomplished offline and not directly in response to an asked question. The QQQ or QPQ analysis and/or produced expert cloud may be stored in, for example, search engine log data 140, storage 170, known expertise tags database 172, and/or known expertise clouds database 174. In these embodiments, a number of stored expertise clouds may grow by, for example, one to two orders of magnitude due to, for example, a second level of expansion. Thenceforth, an incoming question may be decomposed and its components matched to the expertise clouds without any need for expert and/or question cloud generation.

Conversely, in other embodiments, wherein the storage capacity of, for example, search engine log data and/or storage 170 is limited or the number of experts and/or expertise clouds exceeds the storage capacity, expertise tags only could be stored and then incoming questions could be decomposed and expanded in two stages, to match the raw expertise tags.

Figure 6:
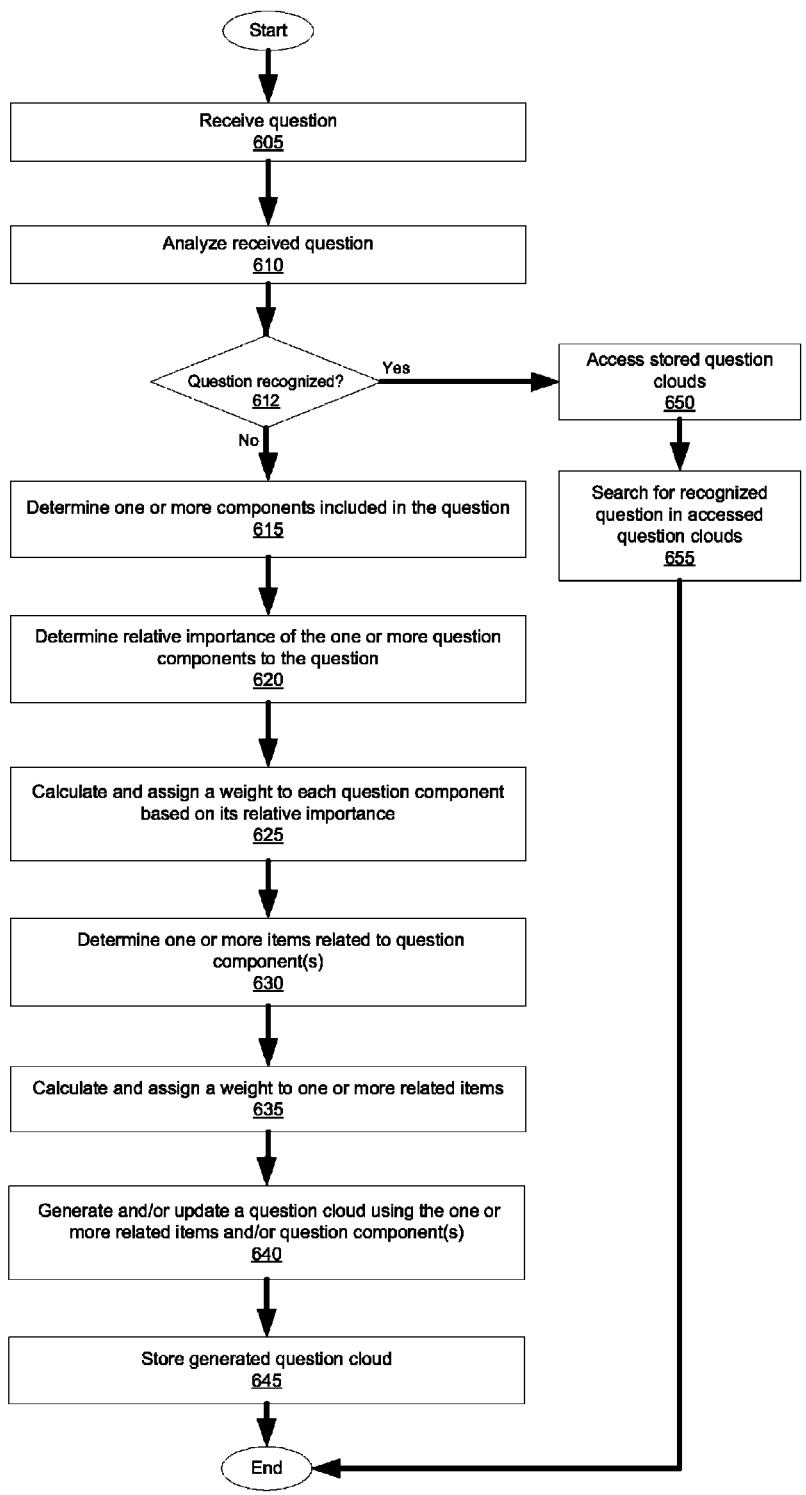
FIG. 6 is a flow chart illustrating an exemplary process for generating a question cloud, in accordance with an embodiment of the present invention.

FIG. 6 illustrates an exemplary process 600 for generating a question cloud. Process 600 may be executed by, for example, systems 100, 200, 300, and/or any combination thereof.

In step 605, a question may be received from a user via, for example, a user computer system like user computer system 105 and/or a receiving/transmission module like receiving/transmission module 125. The format of the question may be, for example, written or oral. In the case of an orally posed question, the question may be received via a microphone like microphone 370.

In step 610, the received question may be analyzed in order to determine, for example, one or more concepts related to the question, the length of the question, and/or whether the question is recognized or known by, for example, a question and expert matching system like question and expert matching system 200 and/or stored in a known question cloud database like known question cloud database 178 (step 612).

When a question is recognized, one or more stored, pre-calculated question clouds may be accessed (650) and searched in order to locate a question cloud associated with the recognized question (step 655). Accessed question clouds may be stored in, for example, storage 170 and/or known question cloud database 178. Following step 655, process 600 may end.

When a question is unrecognized, the question may be decomposed, or otherwise analyzed, in order to determine one or more components, such as a term, phrase, or string included in the question that may be recognized as in step 615. One way to determine the components of a question is to decompose the question into components, such as smaller and smaller strings or terms until the components are recognizable to the determining entity. In some embodiments, the terms or strings included in a question may be determined by using language interpretation rules, such as natural language rules.

The component decomposition of the question may be complete when, for example, the decomposed components are recognizable by determining entity and/or one or more concepts related to a component are found. In most cases, the decomposition and/or analysis of the received question may cease when one or more decomposed components are recognized.

Exemplary components include terms, phrases, strings, and/or any combination thereof that are included in a question. For example, the question "What is the best place to fish for salmon in Northern California?" may be analyzed and decomposed into the components "fish," "salmon," and "Northern California."

Further details regarding the decomposition of a question into components and/or strings and assigning weights or scores to the relationships found (query decomposition and scoring of the subsequent QQ relationships) can be found in U.S. patent application Ser. No. 12/060,778, describing Query Approximation which is incorporated herein in its entirety.

In step 620, a relative importance of the one or more components may be determined. Details regarding a calculation of a component's relative importance are provided below with reference to, for example, FIGS. 9-12. For the exemplary question provided above, the term "fish" may be determined to be the most important component while the components "salmon" and "Northern California" may be relatively less important to the question as a whole.

In step 625, a weight may be calculated and assigned to one or more components based on, for example, the relative importance of the one or more components included in the question. The relative importance of a component may be based, for example, a component's proportional length relative to the length of the question, an inverse frequency of a component's frequency of use as recorded in a search engine log, like search engine log data 140, and/or whether the component is known to be a named entity such as a famous individual or company or place name. Additional details regarding the process of step 625 are provided below with reference to, for example, FIGS. 9-12.

Figure 7A:
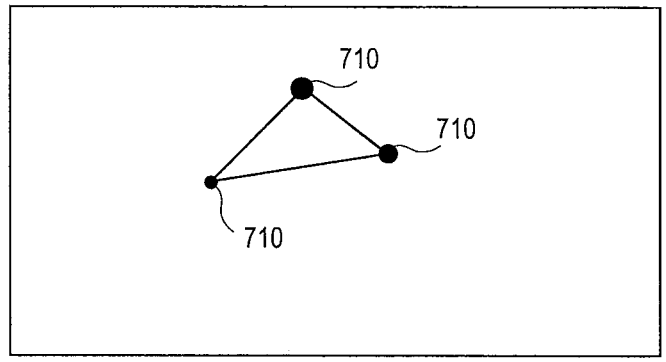
FIG. 7A is a diagram illustrating an exemplary set of question components included in a question, in accordance with an embodiment of the present invention.

FIG. 7A illustrates an exemplary set of components 710 included in a question 705. The relative importance of a component 710 to question 705 is indicated by the relative size of components 710. In the example provided above, the component "fish" may be represented graphically by the largest component 710, while "salmon" and "Northern California" may be represented graphically by the relatively smaller components 710.

In step 630, one or more items related to the one or more components may be determined. The process of step 630 may resemble the process of step 435 as discussed above with regard to FIG. 4.

In some cases, step 630 may include searching one or more sources of secondary information for information relating to the component(s). Such related information may be referred to herein as a "related item." Exemplary sources of secondary information include search engine log data, reference data, and editorial data, such as search engine log data 140, reference data 150, and editorial data 155, respectively.

For example, a question like "What is confederate currency?" may be related to queries, picks, and/or URLs including the topics of "Civil War," "United States history," "confederate paper money," and/or "Civil War money."

In step 635, a weight or score may be calculated and/or assigned to one or more found related items and/or paths between a related item and a component based on, for example, the strength of the relationship between the related item and the component. Step 635 may resemble step 440 as discussed above with regard to FIG. 4. Further details regarding the process of step 635 are provided below with reference to FIGS. 9-12.

Figure 7B:
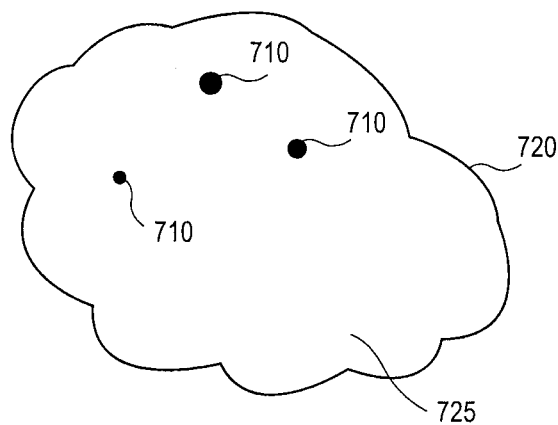
FIG. 7B is a diagram illustrating an exemplary question cloud, in accordance with an embodiment of the present invention.

FIG. 7B illustrates an exemplary question cloud A 720 generated for the received question that includes components 710 and found related items 725. Related items 725 are shown in FIG. 7B as the space included within question cloud 720.

Table 5 provides a table of exemplary related items for the question "When will there be a Mars colony?" In this case, there is only one component, "Mars colony." If there were more than one, an additional weight estimating the relative importance of each component within the question would be considered.

The related items column lists items related to "Mars colony" in order of highest to lowest weight. The frequency column indicates the frequency with which queries containing "Mars colony" are asked by, for example, search engine users. The global weight column indicates the frequency with which related items are asked by, for example, search engine users. The Weight column indicates the frequency at which the related items are asked in the same session as the query "Mars colony" by, for example, search engine users.

TABLE 5

| Related Item | Frequency | Weight | Global weight |
| --- | --- | --- | --- |
| Mars colony | 333.2 | 333.2 | 333.2 |
| Mars colony designs | 333.2 | 20.0 | 77.0 |
| living on Mars | 333.2 | 18.9 | 1371.6 |
| Mars colonization | 333.2 | 13.2 | 516.0 |
| Mars | 333.2 | 10.6 | 133376.3 |
| can people live on Mars | 333.2 | 9.1 | 1027.8 |
| Mars colony models | 333.2 | 8.7 | 40.0 |
| how to make a colony on Mars | 333.2 | 7.5 | 34.3 |
| colonizing Mars | 333.2 | 7.0 | 453.5 |
| colonies on Mars | 333.2 | 6.8 | 169.7 |
| colony on Mars | 333.2 | 4.9 | 127.7 |
| life on Mars | 333.2 | 3.3 | 15199.5 |
| interesting facts about Mars | 333.2 | 3.2 | 9929.5 |
| space settlements | 333.2 | 3.2 | 134.8 |
| space colony design | 333.2 | 3.0 | 241.0 |
| Mars be colonize | 333.2 | 2.4 | 17.8 |
| water on Mars | 333.2 | 2.4 | 3991.3 |
| Mars colonies | 333.2 | 2.4 | 96.6 |
| moon colony | 333.2 | 2.4 | 300.6 |
| how do you build a colony on Mars | 333.2 | 2.4 | 29.5 |
| atmosphere on Mars | 333.2 | 2.0 | 1383.0 |
| colonization on Mars | 333.2 | 2.0 | 186.4 |
| humans ever live on Mars | 333.2 | 1.9 | 19.6 |
| food on Mars | 333.2 | 1.9 | 386.0 |
| space exploration | 333.2 | 1.9 | 14766.0 |
| terraforming | 333.2 | 1.8 | 666.6 |
| space colonies | 333.2 | 1.8 | 585.0 |
| can humans live on Mars | 333.2 | 1.6 | 1664.8 |
| future Mars | 333.2 | 1.5 | 55.2 |
| Mars the planet | 333.2 | 1.5 | 15737.9 |
| terraforming Mars | 333.2 | 1.4 | 683.0 |
| facts about Mars | 333.2 | 1.4 | 29013.6 |
| space colony | 333.2 | 1.4 | 655.8 |
| Mars colonizing | 333.2 | 1.3 | 140.2 |
| biodome | 333.2 | 1.2 | 1839.5 |
| crew for mission to Mars | 333.2 | 1.1 | 4.0 |
| is it possible to colonize Mars | 333.2 | 1.0 | 107.7 |
| Mars colony project | 333.2 | 1.0 | 17.8 |
| Mars soil | 333.2 | 1.0 | 362.8 |
| weather on Mars | 333.2 | 0.9 | 2682.4 |
| Mars atmosphere | 333.2 | 0.9 | 6204.1 |
| Valles Marineris | 333.2 | 0.9 | 1033.7 |
| pictures of a Mars colony | 333.2 | 0.9 | 4.0 |
| NASA | 333.2 | 0.9 | 105066.8 |
| future city | 333.2 | 0.8 | 890.8 |
| transportation on Mars | 333.2 | 0.7 | 145.0 |
| designing space colonies | 333.2 | 0.7 | 69.5 |
| what games are suitable for Mars | 333.2 | 0.7 | 5.0 |
| problems with living on Mars | 333.2 | 0.7 | 111.3 |
| the red planet | 333.2 | 0.6 | 1108.2 |
| colonization of Mars | 333.2 | 0.6 | 232.8 |
| people on Mars | 333.2 | 0.6 | 231.5 |
| energy on Mars | 333.2 | 0.5 | 92.3 |
| futuristic Mars | 333.2 | 0.5 | 32.3 |
| underwater future city | 333.2 | 0.5 | 296.6 |
| how far is Mars from earth | 333.2 | 0.5 | 6402.1 |
| would it be possible to live on Mars | 333.2 | 0.5 | 247.9 |
| basic facts of Mars | 333.2 | 0.5 | 3017.3 |

In step 640, a question cloud may be generated using, for example, the found related items and/or components associated with the received question. In step 645, the question cloud may be stored in, for example, storage 170 and/or known question cloud database 178, and process 400 may end.

Figure 8:
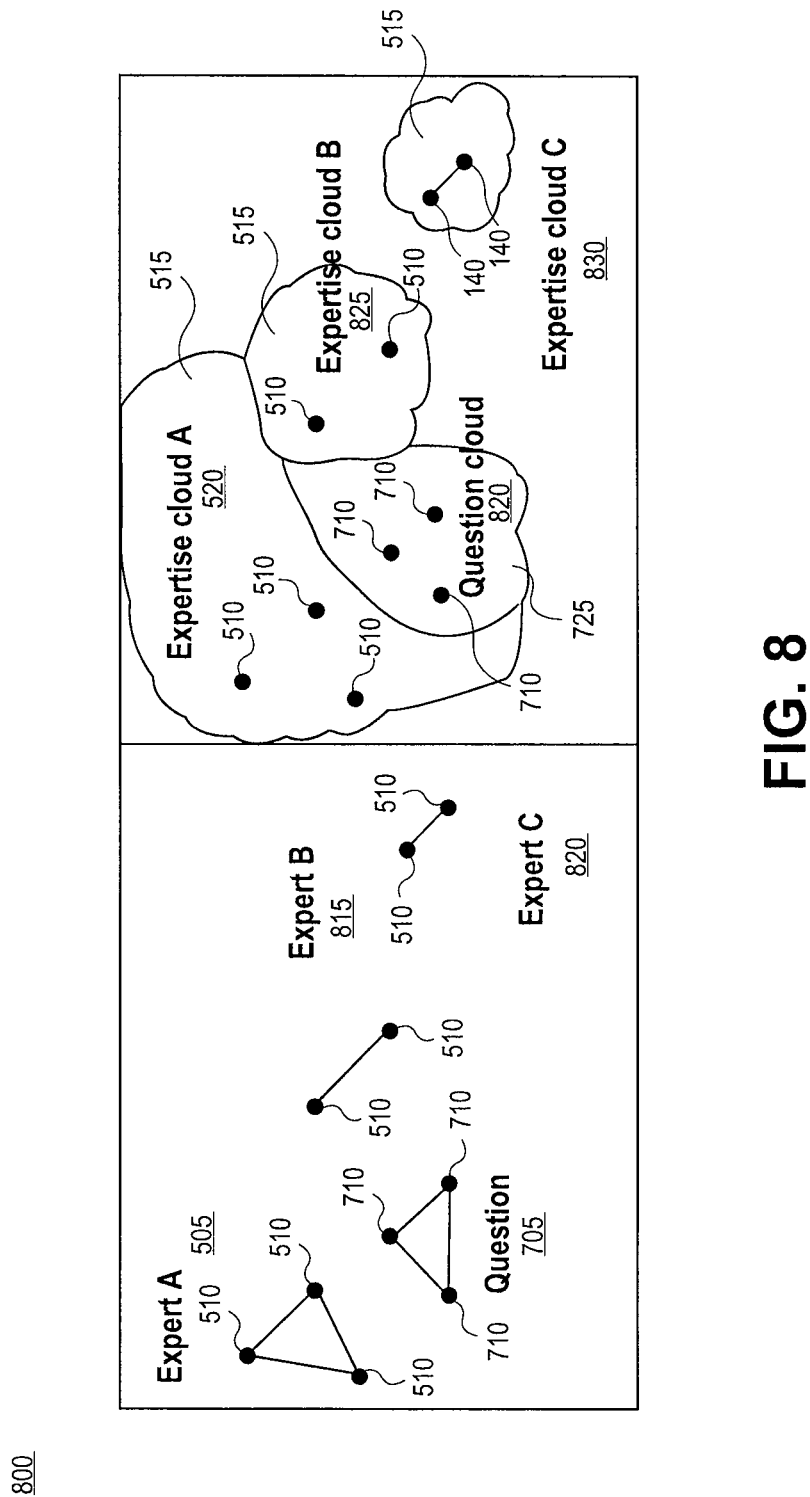
FIG. 8 is a diagram illustrating expertise tags associated with experts A-C, question components associated with a question, expertise clouds, and a question cloud, in accordance with an embodiment of the present invention.

FIG. 8 is an exemplary graphic depiction 800 of expertise tags 510 associated with Expert A 505, Expert B 815, and Expert C 820 and components 710 associated with question 705. FIG. 8 also includes generated expertise cloud A 520, expertise cloud B 825, expertise cloud C 830 and question cloud 820. Expertise tags 505 and expertise clouds 520, 820, and 825 may be determined and/or generated via, for example, process 400 as discussed above with regard to FIG. 4. Components 710 and question cloud 820 may be determined and/or generated via, for example, process 600 as discussed above with regard to FIG. 6.

The relative strength of the associations of the expertise clouds to question cloud 820 is represented graphically by the relative proximity of expertise cloud A 520, expertise cloud B 825, and expertise cloud C 830 to question cloud 820. For example, expertise cloud A 520 and expertise cloud B 825 overlap question cloud 820 while expertise cloud C 830 does not overlap question cloud 820 and is placed relatively far away from question cloud 820. Thus, expertise cloud A 520 and expertise cloud B 825 are more closely associated with question cloud 820 than expertise cloud C 830. Further details regarding the association of expertise clouds and question clouds are provided below with regard to FIGS. 9-12.

Figure 9:
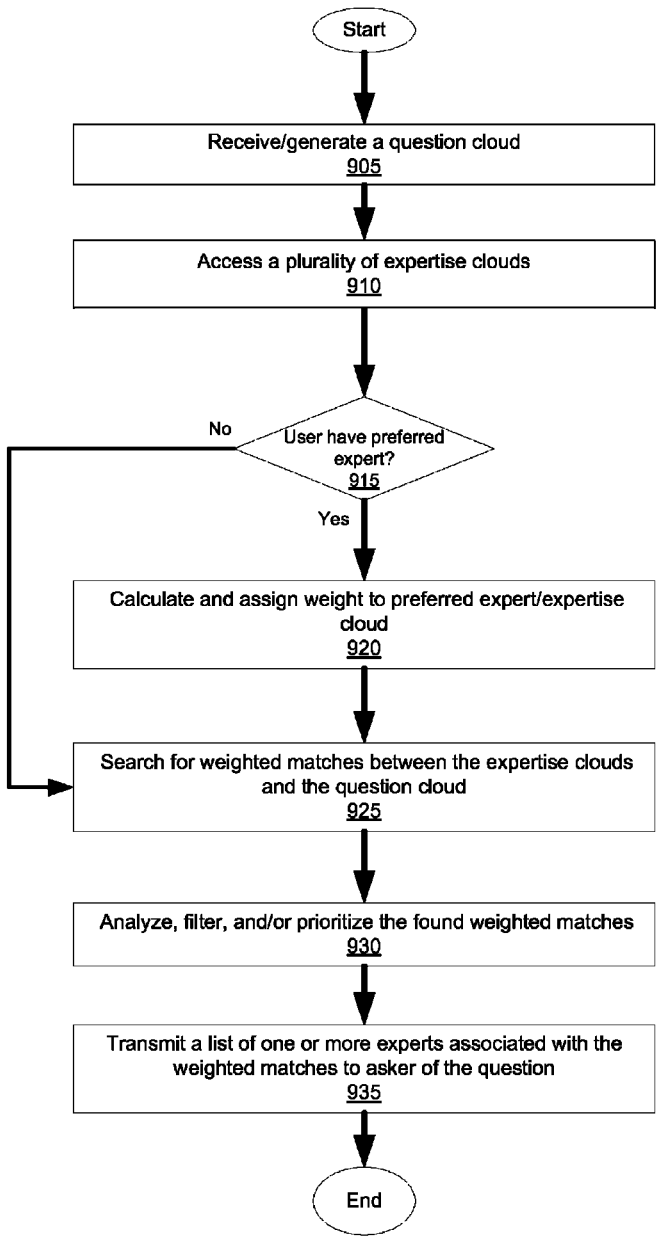
FIG. 9 is a flow chart illustrating an exemplary process for matching a question with an expert, in accordance with an embodiment of the present invention.

FIG. 9 illustrates an exemplary process 900 for matching a question with one or more experts and/or areas of expertise. Process 900 may be executed by, for example, systems 100, 200, 300, and/or any combination thereof.

Figure 10:
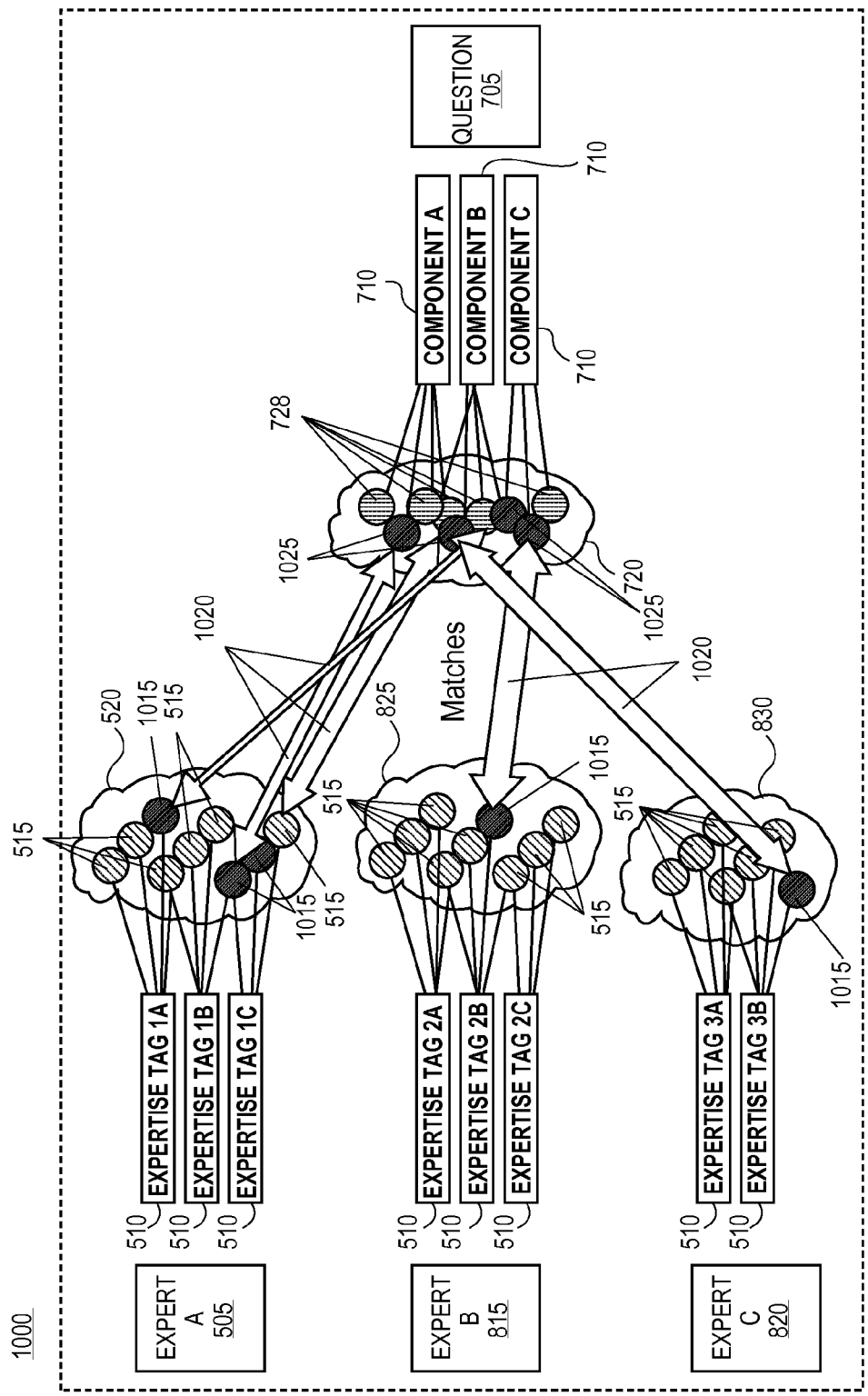
FIG. 10 is a diagram illustrating an exemplary graphic depiction of matching a question with one or more experts, in accordance with an embodiment of the present invention.

FIG. 10 is an exemplary graphical depiction of a process, like process 900 for matching a question with one or more experts and/or areas of expertise. For ease of understanding, FIGS. 9 and 10 will be discussed together.

In step 905, a question cloud, like question cloud 720, may be received and/or generated. The question cloud may be received after step 600.

A generated question cloud may be generated in real time via, for example, process 600 as discussed above with regard to FIG. 6. A received question cloud like question cloud 720 of FIG. 10 may be generated based on, for example, components A-C 710, related items 725, and/or matching related question items 1025.

In step 910, a plurality of expertise clouds, like expertise cloud A 520, expertise cloud B 825, and/or expertise cloud C 830 of FIG. 10 may be accessed. Expertise cloud A 520 may include, for example, expertise tags 1A-1C 510, related items 515, and/or matching expertise related items 1015. Expertise cloud B 825 may include, for example, expertise tags 2A-2C 510, related items 515, and/or matching expertise related item 1015. Expertise cloud C 830 may include, for example, expertise tags 3A-3C 510, related items 515, and/or matching expertise related item 1015.

In one embodiment, the plurality of expertise clouds may have been pre-calculated and stored in data storage, like data storage 170 and/or known expertise cloud database 174. In some cases, storage may include a plurality of pre-generated expertise clouds such that the generation of expertise clouds is done offline and stored prior to receipt of a question and/or question cloud. Pre-processing of expertise clouds provides the advantages of reducing the time and processing power needed to perform method 900. In another embodiment, the accessed expertise clouds may be formed as needed after, for example, the question cloud is received as part of step 910.

In step 915, it may be determined whether a user asking the question has a preferred expert or group of experts for answering all questions asked by the user or answer questions related to a particular topic. The establishment of a preferred expert by a user is discussed in further detail with regard to FIG. 13 as provided below. When the user has a preferred expert, a weight indicating one or more characteristics of the preference may be calculated and/or assigned to the expert (step 920).

Whether or not a user has preferred experts, in step 925, the content included in the plurality of expertise clouds may be searched, according to, for example, one or more search criterion, in order to find one or more weighted match(es) between the accessed expertise clouds and the question cloud. One exemplary criterion used for executing the search of step 925 is whether an expertise cloud has a threshold degree of relevancy to the question and/or a match between an expertise cloud and a question cloud has a threshold degree of quality. Weighted matches between matching expertise related items 1015 and matching question related items 1015 are shown in FIG. 10 wherein the weights of the matches are graphically indicated by the width of the arrows connecting the matching related items.

The amount of searching required to find expertise clouds with sufficient relevancy to the question cloud and/or matches of sufficient quality may depend on a variety of factors. For example, the specificity of the accessed expertise clouds may effect how many potential expertise cloud matches are found. Naturally, expertise clouds generated with specific or numerous expertise tags will be more specific to the particular expertise of an expert and will increase the likelihood of a high quality match with a question cloud.

In cases where expertise clouds are general (e.g. the expertise tags are not specific and/or an expertise cloud includes relatively few expertise tags and/or related items), a relatively large number of expertise clouds that match the question cloud may be found. However, not all of these expertise clouds will match the question cloud equally well and further analysis, filtering, and prioritizing of the results may be necessary in order to locate expertise clouds that match the question cloud with a threshold degree of relevancy and/or quality.

In step 930, the found weighted matches may be analyzed, filtered, and/or prioritized according to one or more criterion. Analysis of the weighted matches may include a statistical analysis of a weighted match in order to determine, for example, the validity of the match based on one or more factors, such as statistical factors, a degree of specificity of the found expertise cloud(s), a degree of relevance between the expertise cloud and the question cloud, and/or a degree of quality for a weighted match. The quality of a match may be determined based on, for example, the overall extent of the weighted overlap of an expert's expertise cloud with the cloud associated with an incoming question. In some embodiments, the determined quality of a match may determine a quality score that may be associated with the weighted match.

Weighted matches may be filtered according to, for example, a user preference, in order to reduce noise, remove weighted matches that do not have a threshold amount of relevancy to the question cloud, and/or remove weighted matches that do not have a threshold amount of match quality. In some cases, the filtering of step 930 may also prevent a statistical outlier from triggering an artificially high score match.

The weighted matches may also be prioritized and/or ranked according to one or more criteria. The criteria used may be, for example, a user selected criterion such as geographic location of the expert or minimum level of education of the expert, the quality score assigned to the match, the weight assigned to the matches, and/or the degree of relevancy of the match. The weighted matches may be sorted or ranked according to their priority such that the highest priority match is listed first and the remainder of the matches is listed in an order consistent with their decreasing priority.

In the example of FIG. 10, expert A 505 has the greatest number of related items in common with question cloud 720. Thus, expert A 505 may be prioritized first in a list of experts available to answer question 705. Expert B 815 may be prioritized second in the list of experts because the path between the matching related item of expert B 815 and the question cloud is weighted higher than the path between the matching related item of expert C 830 and question cloud 720 as indicated by the greater width of the arrow between expertise cloud B 825 and question cloud 720.

In one embodiment, the analysis of step 930 may include determining how many independent weighted matches, or paths, are found between the question and an expert and/or expertise cloud and/or the strength of each path. In another embodiment, the analysis of step 930 may include determining the size of an expertise cloud that is associated with a weighted match.

In step 935, a list of one or more experts associated with the weighted matches may be prepared based on, for example, the process of step 930, and transmitted to, for example, the user that asked the question. Following step 935, process 900 may end.

Figure 11:
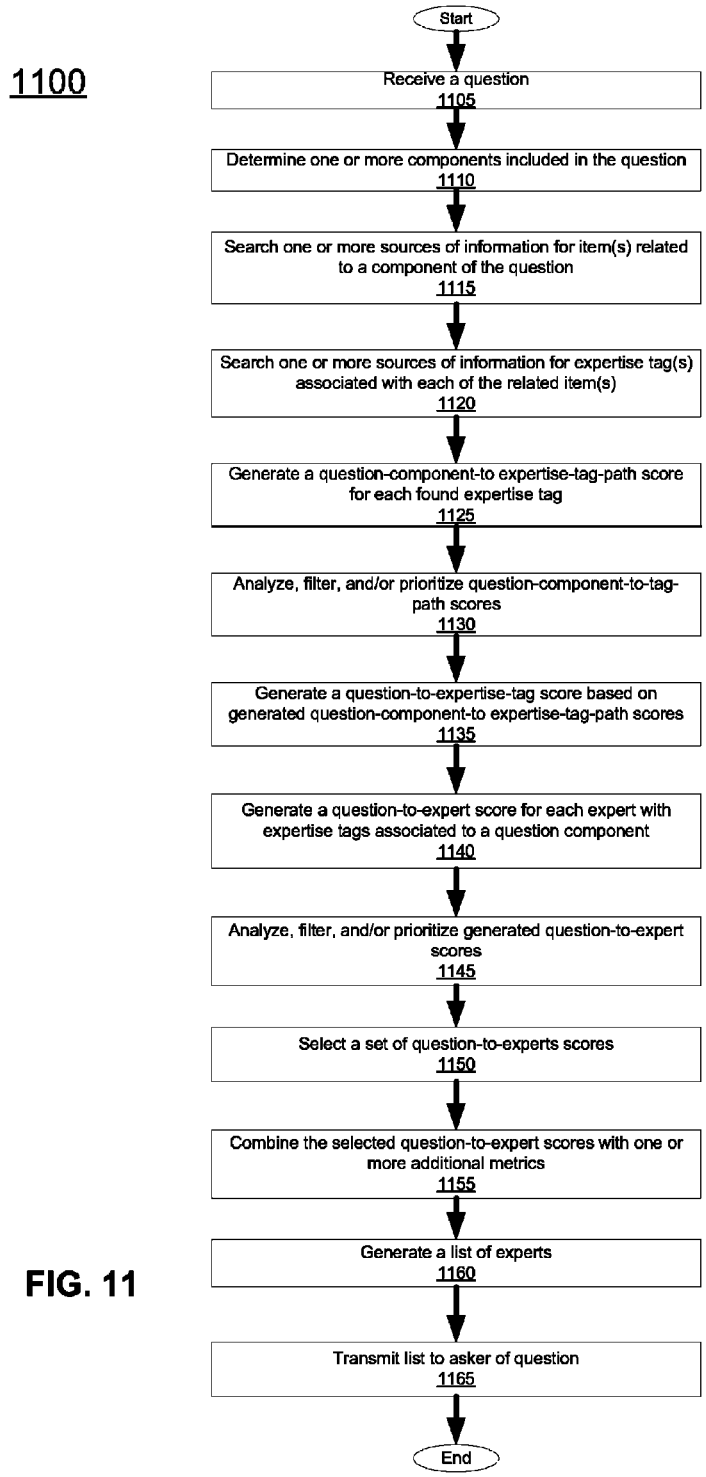
FIG. 11 is a flow chart illustrating an exemplary process for matching a question with an expert, in accordance with an embodiment of the present invention.

FIG. 11 is a flow chart illustrating an exemplary process 1100 for matching a question with an expert. Process 1100 may be executed by, for example, systems 100, 200, 300, and/or any combination thereof.

Figure 12:
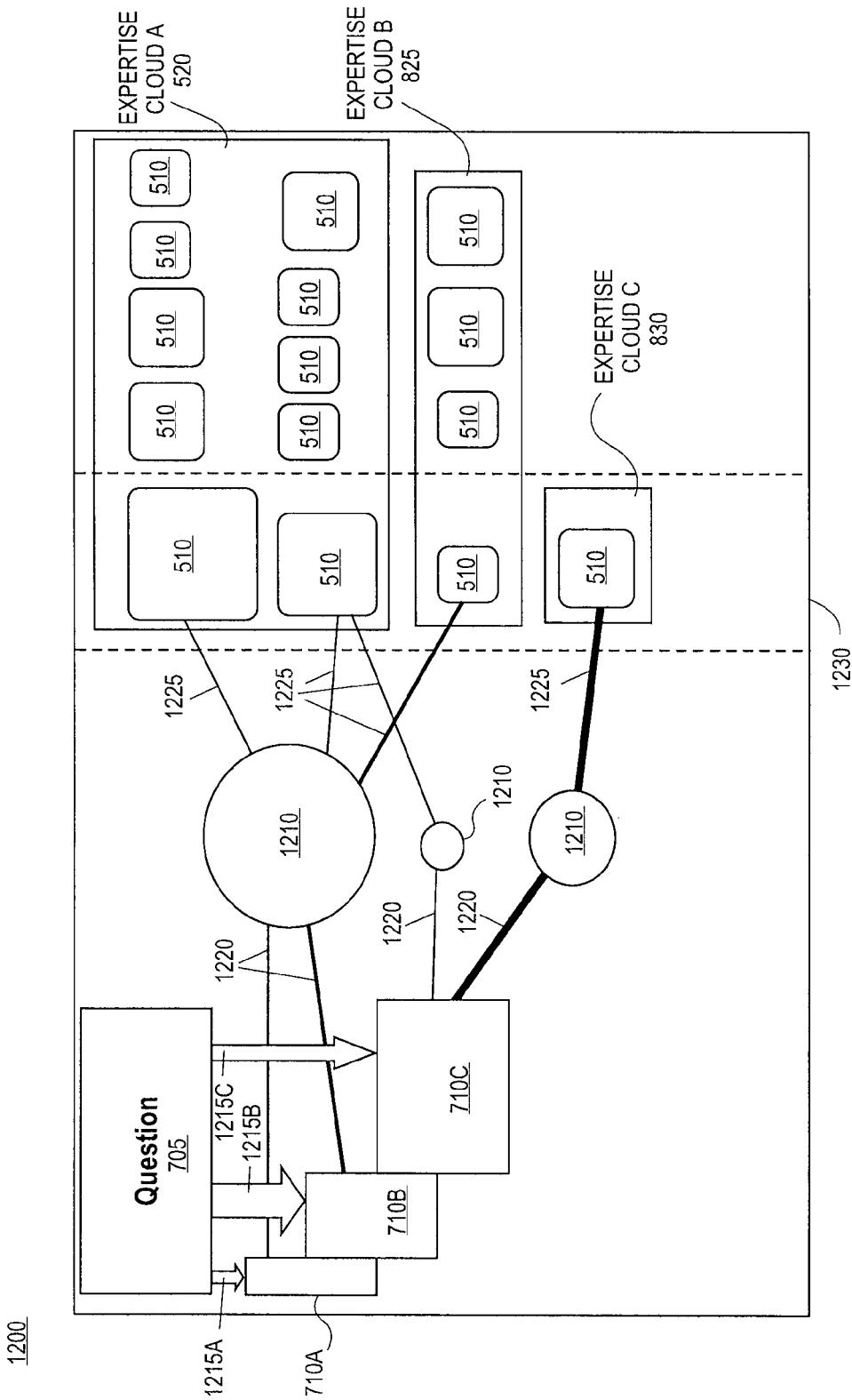
FIG. 12 is a diagram illustrating an exemplary graphic depiction of matching a question with one or more experts, in accordance with an embodiment of the present invention.

FIG. 12 is a block diagram illustrating an exemplary graphical depiction of matching a question with an expert corresponding with process 1100. For ease of understanding, FIGS. 11 and 12 will be discussed together.

In step 1105, a question, such as question 705, may be received by, for example, a matching system, question and expert matching system 120. Step 1105 may be similar to, for example, step 605 as discussed above with regard to FIG. 6.

In step 1110, one or more components included in the received question may be determined. Step 1110 may be similar to, for example, steps 615 and 620 as discussed above with regard to FIG. 6. A graphic representation of three components included in question 705 is represented as components 710 A-C in FIG. 12, wherein the relative sizes of components 710 represent, for example, the relative size of the component when compared with the size of the question overall or the relative importance of the component to the question. In this way, it can be seen that component 710c is the largest component of question 705, component 710a is the smallest component, and the size of component 710b is between the size of components 710a and 710c.

The relative importance, or weight, of components 710a-c to question 705 is graphically represented by three different arrows 1215a-c, which are shown in three different sizes.

Although, the relative weights of components 710a-c and arrows 1215a-c are shown by the relative size of the respective squares and arrows in FIG. 12, any form of differentiation between the components and/or arrows may be used to demonstrate their relative importance or weight. For example, shading, color, and/or patterns may be used to show relative differences.

In one example, the question "What is the best place to fish for salmon in Northern California?" may include the components "salmon," "fish," and "Northern California." The components are salmon, fish, and Northern California and may be graphically depicted as components 710a-c, respectively. The component "fish" (represented graphically as component 710b) may be determined to be the most important component included in the question. The relative importance of "fish" is shown as arrow 1215b, which is graphically depicted in FIG. 12 as the widest arrow.

In step 1115, one or more sources of information may be searched for items related to a component or components. Exemplary information sources include search engine log data as stored in, for example, search engine log database 140, query data as stored in, for example, query database 142, pick data as stored in, for example, pick database 144, URL data as stored in, for example, URL database 146, reference data as stored in, for example, reference database 150, and editorial data as stored in, for example, editorial database 155.

Related items found via the process of step 1115 are graphically represented as related items 1210 in FIG. 12 wherein the relative strength, or overlapping relevance of the related items is graphically depicted as differences in the size of related items 1210. The relative strength of the path or connection between a related item and a component is depicted by the relative thickness of the component/related item paths 1225 connecting a component 710 a-c with a related item 1210.

In step 1120, one or more sources of information including pre-calculated expertise clouds and/or presently generated expertise clouds may be searched for one or more expertise tags and/or expertise clouds that are associated with the related items found at step 1115. Exemplary sources of information that may be searched include storage 170, known expertise tags database 172, known expertise cloud database 174, found expert/question matches database 180, and expert information database 182.

Searched expertise clouds are graphically represented in FIG. 12 as expertise cloud A 520, expertise cloud B 825, and expertise cloud C 830. The expertise tags associated with expertise clouds A-C 520, 825, and 830 are graphically represented as expertise tags 510 within section 1230 of FIG. 12. The relative importance of an expertise tag to an expert's expertise cloud is graphically depicted in FIG. 12, by the various sizes of expertise tags 140. Expertise tags 510 that are associated with related items 1210 are connected to related items 1210 via related item/expertise tag paths 1225. The relative strength of related item/expertise tag paths 1225 is depicted in FIG. 12 by the relative thickness of the lines connecting a expertise tag 510 with a related item 1210.

In step 1125, a question-component-to-expertise-tag-path score, $S_{QRT}$ may be generated. The $S_{QRT}$ may be a calculated score, or weight, derived from a relationship between a component and an expertise tag via related item that is associated with both the component and the expertise tag. An exemplary formula for calculating a $S_{QRT}$ is as follows:

$$S_{QRT} = C\left[\left(\frac{m}{R \times (D+d)}\right)\frac{(Q \times T)}{(Q+T)}\right]^{E} \quad \text{Equation 1}$$

where:

$$Q = Q_R/q \quad \text{Equation 2}$$

$$T = T_R/t \quad \text{Equation 3}$$

The definition of the variables included in Equation 1 may vary depending on the method and the type of data used and to find the related item. For example, when using QQ data to find a related item, the variables used in Equation 1 may be defined as follows:

TABLE 6

| Symbol | Definition | Notes |
|---|---|---|
| Q | QQ score from component to related item; may be normalized. | In some embodiments, the definition of Q may include additional factor(s) based on, for example, a relative weight of a component as a part of question. |
| T | QQ score from related item to expertise tag; may be normalized. | In some embodiments, the definition of T may include additional factor(s) based on, for example, a relative weight of component as a part of tag. |

TABLE 6-continued

| Symbol | Definition | Notes |
|---|---|---|
| $Q_R$ | QQ score from component to related item | |
| $T_R$ | QQ score from related item to expertise tag | |
| q | global popularity score of component | |
| t | global popularity score of expertise tag | |

TABLE 7

| Symbol | Definition | Notes | Exemplary Default Values |
|---|---|---|---|
| R | global popularity score of related item | Preferably the sum of QQ scores over all Q. | |
| D | number of experts having related item in their expertise clouds | In some embodiments, D may account for differences in makeup or format of accessed expertise database vs. accessed search log data. For example, a very popular searched for item (high R) may be unpopular among known experts, or vice versa. In some embodiments when, for example, the storage for the known experts and/or search log data may become relatively very large R may be replaced by D. | |
| d | count constant | d may serve to mitigate the influence of a small value for D. | 1-3 |
| C | component weight | In some embodiments, C may be incorporated into Q. | When C is incorporated into Q, use 1. |
| E | path exponent | Value near 1.0 gives more influence to strongest individual path scores. Value near 0 gives more influence to the number of individual paths. | 0.5 |
| m | magnitude constant | m may serve to generate convenient value sizes for computation and comparison. | 10^12 |

Global popularity scores refer to the popularity of a related item, expertise tag, etc. among search engine users. The incorporation of a value for R into the calculation of $S_{QRT}$ may also contribute to noise control, as very popular related items may yield many noisy paths, but these paths will tend to have low scores when the value of R is relatively large.

It is critical to remember to include the tag itself (and the question itself) as related items in the cloud, with T and Q respectively of 1.0, as the tag may be a member of the question cloud, or the question may be a member of the tag cloud, and either case would likely contribute to a strong path score.

In some embodiments, the ratio:

$$\frac{(Q \times T)}{(Q + T)} \quad \text{Equation 4}$$

may be strongly influenced by the smaller of the two ratios, Q and T, and may be very weakly influenced by the larger of the two. The ratio may also be a factor in controlling noise or erroneous act calculations. In some cases, the range of the resulting ratio may be limited to 50% to 100% of the smaller of the two ratios. This may result in a path from a question to an expertise tag that has one strong relationship and one weak relationship having a low score. In contrast, a path from a question to an expertise tag where both relationships are of moderate strength may have a significantly higher score, especially when all other factors between the calculations are equal.

When using QPQ data, related items, graphically depicted as related items 1210 in FIG. 12, are picks (P) or URLs instead of queries as when using QQQ data as provided above. As such, the generation of a question-component-to-expertise-tag-path score, $S_{QRT}$, when using QPQ data is substantially similar to the process for generating a question-component-to-expertise-tag-path score, $S_{QRT}$, when using QQQ data described above and may be calculated using Equations 1-3, provided again below although, the definition of some of the variables is different, as shown in tables 8 and 9 below.

$$S_{QRT} = C\left[\left(\frac{m}{R \times (D + d)}\right)\frac{(Q \times T)}{(Q + T)}\right]^E \quad \text{Equation 1}$$

where:

$$Q = Q_R/q \quad \text{Equation 2}$$

$$T = T_R/t \quad \text{Equation 3}$$

where:

TABLE 8

| Symbol | Definition | Notes |
|---|---|---|
| Q | QP score from component to related item; may be normalized | Where Qapx is used, definition includes other factors based on weight of component as a part of question. |
| T | QP score from tag to related item; may be normalized | Where Qapx is used, definition includes other factors based on weight of component as a part of tag. |

TABLE 8-continued

| Symbol | Definition | Notes |
|---|---|---|
| $Q_R$ | QP score from component to related item | |
| $T_R$ | QP score from related item to expertise tag | |
| q | global popularity score of component | |
| t | global popularity score of expertise tag | |

TABLE 9

| Symbol | Definition | Notes | Default |
|---|---|---|---|
| R | Global popularity score of related item | Preferably the sum of QP over all Q. | |
| D | number of experts having related item in their clouds | This factor accounts for differences in makeup of the expertise database vs. search log data - a very popular item in search (high R) may be rare among our experts, or vice versa. When the db becomes very large, R can be replaced by D. | |
| d | count constant | Mitigates the influence of very small D. | 1-3 |
| C | component weight | In Qapx, this is rolled into Q. | In Qapx, use 1 |
| E | path exponent | Value near 1.0 gives more influence to strongest individual path scores. Value near 0 gives more influence to number of individual paths. | 0.5 |
| m | magnitude constant | To generate convenient value sizes for computation and comparison. | 10^12 |

In some embodiments, pseudo-QPQ cloud data is searched in order to find items related to a component and/or expertise tag as in step 1120. The pseudo-QPQ data may be stored in, for example, storage 170, and/or URL database 146. When using pseudo-QPQ cloud data to find related items, as depicted as related items 1210 in FIG. 12, the Q and P relationships to a component and/or expertise tag discussed above are replaced with a list of one or more URLs related to the component/expertise tag. The list of URLs may be formed from one or more URLs found via, for example, web search and may be ranked according to, for example, their popularity among search engine users and/or their relevance to the component and/or expertise tag. In this way, the list of URLs may employ full web search intelligence in matching a component to an expertise tag and/or expert.

The path score, when using pseudo QPQ cloud data, is calculated via equation 1 as discussed above with regard to QQQ data, with the exception that Q is calculated via the following equation:

$$Q = \frac{1}{r \times j} \qquad \text{Equation 4}$$

where:

TABLE 10

| Symbol | Definition | Notes | Default |
|---|---|---|---|
| r | Web search rank of result | Top result = 1, etc. | |
| j | tuning factor | Assists in the generation of a realistic Q value. Top Q results for components tend to have a score of 0.1-0.25. Results around #100 tend to have a score of 0.001-0.003. | 5 |

The Q score calculated via Equation 4 may be normalized.

One potential drawback to using pseudo-QPQ cloud data is that the path scoring of the relationship of each URL to a component and/or expertise tag may not yield results as precise as those produced when QQQ and/or QPQ data is used, as discussed above. In some cases, the highest scoring URLs may be better matches to a component and/or expertise tag than lower scoring URLs, but in many cases, the difference between high scoring URLs and low scoring URLs may be difficult to quantify.

In some embodiments, the value of Q for the top few URLs may not have a major influence on the process of matching the components to an expertise tag as these scores may tend to be larger than the Q scores associated with expertise tags. Thus, URLs associated with smaller Q scores may contribute more to a matching of a component to an expertise tag.

In step 1135, a question-to-expertise-tag score $S_{QT}$ may be calculated using, for example, Equation 5 provided below. Calculation of a question-to-expertise-tag score provides for the summation of one or more path scores associated with a given expertise tag over all paths between the expertise tag and the question. In some embodiments, when, for example, a non-Qapx query decomposition of the question is used, step 1135 may include a summation of one or more path scores for a given expertise tag over all paths between the expertise tag and all components included in the question.

$$S_{QT} = \sum_R S_{QRT} \qquad \text{Equation 5}$$

where:
 $S_{QRT}$=path score;
 R=a global popularity score of a related item; and
 $S_{QT}$=question-to-expertise-tag score.

A potential outcome of calculating a question-to-expertise-tag score for a plurality of expertise tags via step 635 is a list of question-to-expertise-tag scores. Typically, a few expertise tags within the list may have a strong or high value question-to-expertise-tag score while many other expertise tags may have a weak or low value question-to-expertise-tag score. It may be beneficial to filter and/or prioritize a list of question-to-expertise-tag scores according to their value. The prioritized list may then be truncated to remove scores that fall below a threshold amount. For example, the prioritized list may be truncated so that expertise tags that account for a given percentage, for example, 90-95%, of the value of the sum of all $S_{QT}$ are retained.

In step 1140, a question-to-expert score $S_{QE}$ may be calculated via, for example, Equation 6, provided below. The question-to-expert score may be a summation of a function of the question-to-expertise-tag scores $S_{QT}$ over all expertise tags T associated with the expert, divided by the size of the expert's cloud size raised to an exponent.

$$S_{QE} = \frac{1}{z^a} \sum_T (S_{QT})^b \qquad \text{Equation 6}$$

where:
$S_{QT}$=question-to-expertise-tag score;
$S_{QE}$=question-to-expert score;
and

TABLE 11

| Symbol | Definition | Notes | Default |
|---|---|---|---|
| z | expert's cloud size | Number of items in the expert's cloud | |
| a | attenuation exponent | Determines how much an expert's cloud size contributes to overall $S_{QE}$ score | 0.25-0.5 |
| b | tag exponent | Value near 1.0 gives more influence to strongest individual expertise tag scores. Value near 0 gives more influence to the quantity of matching expertise tags. | 0.5 |

The expert's cloud size factor, z, and the attenuation exponent, a, are used in an attempt to balance traffic among experts associated with varying numbers of expertise tags. This balance may be referred to as a "list balance." The exponent, a, may be increased when the list balance problem becomes misaligned or otherwise problematic such as when, for example, experts associated with long lists of expertise tags have a statistical advantage in achieving high scores, as it is more likely that they will become associated with many question-to-expert paths. In order to balance traffic among a wide group of experts associated with varying numbers of expertise tags, adjustments to the value of z may be made such that experts associated with long lists of expertise tags are devalued and experts associated with relatively shorter lists of expertise tags are overvalued.

In one embodiment, the generation of a question-to-expert score may include determining how many independent weighted matches, or paths, are found between the question and an expert and/or expertise cloud. A weight may be added to experts and/or expertise clouds associated with multiple expertise tags/related item matches. The amount of the weight may be based on the number of paths associated with an expert and/or expertise cloud.

An exemplary received question is "Can blind children be taught to ski?" A preferred expert would be an expert who is associated with the specific expertise of teaching blind children to ski. However, when no such expert is known, or when a known expert is otherwise undesirable, preferred experts may be experts associated with expertise that includes multiple parts of the question, such as experts who teach skiing to children and are familiar with the abilities of the blind, or experts who teach blind children and are familiar with requirements of skiing. Such experts will be weighted higher than an expert associated with just one component of the question, such as "blind children" or "teaching children to ski."

In another embodiment, the generation of a question-to-expert score may include determining the strength of each independent weighted match, or path. This determination may involve one or more frequency and/or weight factors derived from, for example, user search behavior.

For example, the strength of a relationship between a component and a related item may be determined by, for example, a weight associated with the relationship and/or the popularity of the component among search engine users such that highly weighted relationships associated with relatively unpopular components have the strongest relationships.

The strength of a relationship between an expertise tag and a related item may be based on, for example, the weight of the relationship between the expertise tag and the related item and/or the popularity of the expertise tag among search engine users such that highly weighted relationships between an expertise tag and a related item associated with relatively unpopular expertise tags have the strongest relationships.

In yet another embodiment, the generation of a question-to-expert score may incorporate an inverse of a popularity value associated with a related item. An inverse of the popularity value may be a measure of the specificity or generality of the related item such that more specific related items are weighted higher and thus have stronger paths with expertise tags and/or components than relatively general related items.

On some occasions, many weak noisy paths and relatively few strong ones may exist between a question and expertise clouds and/or an experts. An expert, especially one with many tags, may be the terminus of numerous weak paths, which may dominate the scoring if too much weight is placed on path count vs. path strength. Therefore, it may be desirable to filter out a threshold number of paths such that only a portion of the strongest paths is considered. Such filtering may be valuable in excluding noise.

In another embodiment, the generation of a question-to-expert score may incorporate the size of an expertise cloud that is associated with a question. Accounting for the size of an expertise cloud may operate to correct for the number of different areas of expertise an expert is associated with such that an expert associated with hundreds of expertise tags may be associated with numerous weak noisy paths between an expertise tag and a question. The high number of paths may act to push an expert's score above that of a similar expert associated with fewer expertise tags that are more strongly related to the question.

In cases where a plurality of question-to-expert scores are generated, the question-to-expert scores may be analyzed, filtered, and/or prioritized according to, for example, one or more criteria (step 1145). For example, the question-to-expert scores may be analyzed to determine whether they are of a threshold amount or are statistically valid. The question-to-expert scores may also be filtered according to one or more criterion such that, for example, question-to-expert scores below a threshold amount are removed from the plurality of question-to-expert scores. The question-to-expert scores may also be filtered so that question-to-expert scores associated with expertise clouds of a specific size and/or range of sizes are removed from the plurality of question-to-expert scores.

In step 1150, a set of question-to-expert scores may be selected according to one or more criteria. The selection of step 1150 may be based on the analysis, filtration, and/or prioritization of step 1145.

In step 1155, the selected question-to-expert scores may be combined with one or more additional metrics. Exemplary additional metrics include expert reputation rating by users or moderators based on past performance or qualifications, expert responsiveness or promptness based on past performance, geographic proximity of expert to user, demographic proximity of expert to user, the user's expressed preference for a given expert, or any other factors that might aid in estimating the likelihood that an expert will provide a quality answer.

In step 1160, a list of experts may be generated based on the selected question-to-expert scores wherein the experts included in the list are associated with the question-to-expert scores. In step 1165, the list of experts may be transmitted to the asker of the question received in step 1105. Following step 1165, process 1100 may end.

Table 12 below shows the paths through which components match expertise tags via related items, using the question and expertise described in Tables 4 and 5, respectively.

The leftmost block of Table 12 shows the component and its global frequency or popularity among search engine users. The center block shows the related item and its frequency or popularity among search engine users. The rightmost block shows the expertise tag and its frequency or popularity among search engine users. Between the solid blocks are the relationship weights, the first of which, QR, a relationship weight associating the question and the related item. The TR weight is a relationship weight associating the expertise tag and the related item. In the shaded box, the related item happens to be the expertise tag itself.

TABLE 12

| Component and Frequency | | QR weight | Realted Item and Frequency | | TR weight | Expertise and Frequency | |
|---|---|---|---|---|---|---|---|
| Mars colony | 333.16 | 10.6 | Mars | 133376 | 492.5 | NASA | 105067 |
| Mars colony | 333.16 | 10.6 | Mars | 133376 | 26.5 | astronauts | 10855 |
| Mars colony | 333.16 | 10.6 | Mars | 133376 | 19.8 | space travel | 8218 |
| Mars colony | 333.16 | 0.9 | NASA | 105067 | 105067 | NASA | 105067 |
| Mars colony | 333.16 | 0.9 | NASA | 105067 | 95.5 | astronauts | 10855 |
| Mars colony | 333.16 | 0.9 | NASA | 105067 | 102.2 | space travel | 8218 |
| Mars colony | 333.16 | 1.9 | space exploration | 14766 | 401.7 | NASA | 105067 |
| Mars colony | 333.16 | 1.9 | space exploration | 14766 | 33.3 | astronauts | 10855 |
| Mars colony | 333.16 | 1.9 | space exploration | 14766 | 270.3 | space travel | 8218 |

In some cases, differentiation between experts based on a number of factors or criteria may be desired because, for example, multiple experts may be associated with the same areas of expertise but may, in fact, have very different qualifications and/or question response behavior. This differentiation may be implemented by adjusting scores associated with an expert via, for example, weighting an expert's scores based on his qualifications and/or performance. Typically, any feedback, regardless of its type, may be applied to an expert, expertise tags associated with an expert, and/or expert's cloud(s) as a weighted score and/or an adjustment to a previously calculated weight or score.

The feedback may be received from, for example, a user or entity that submits a question, and/or an expert monitor, such as expert monitor 186, that tracks, for example, expert performance and response times, and/or question answering thoroughness. The feedback may be received by question and expert matching system 120 via, for example, receiving/transmission module 125 and may be stored in storage 170 and/or feedback database 188. The feedback received may relate to, for example, an expert's overall performance, an expert's topical performance, and/or an expert's network performance.

Exemplary overall performance feedback includes feedback regarding the overall responsiveness of an expert to questions, such as the fraction of questions submitted to an expert that are answered, an average response time for an answer to be provided by the expert, and any complaints or reviews received regarding the expert. In some cases, overall performance feedback may be applied to an expert directly such that it is applied to any expertise tags and/or clouds associated with the expert.

Exemplary topical performance feedback includes feedback regarding the topic, or area of expertise, associated with a question answered by an expert. Topical performance feedback may be received from a user or may be extracted from a user's correspondence from the expert by expert monitor 186. For example, if a user responds to an expert's answer with a comment like "thanks," or "excellent answer" expert monitor 186 may interpret such comments as favorable feedback regarding the expert. Likewise, correspondence from a user that includes terms that are generally interpreted as negative may serve as negative feedback for the expert. In some embodiments, topical performance feedback may be associated with an expert's tag and/or cloud that is topically related to the topical performance feedback. Reputation weights may be stored in, for example, storage 170, feedback database 188, and/or batch aggregator 160.

In some embodiments, users may be provided with a means to enable them to rate a response received from an expert. An expert may then gain a reputation weight such that, for example, a positive rating by a user may increase a reputation weight assigned to the expertise path that matched him to a given question while a negative rating may decrease a reputation weight assigned to the expertise path that matched him to a given question. A reputation weight may also be applied to related items and/or expertise tags included in an expertise cloud in the matching path.

In embodiments that include a plurality of stored expertise clouds, topical performance feedback may be used to reduce ambiguity introduced by, for example, ambiguous terms like synonyms among expertise tags associated with one or experts. For example, topical performance feedback may be used to adjust the weights of paths between a question and an expertise tag as opposed to adjusting the weight of an individual expertise tag. For example, the expertise tag "China" could indicate expertise regarding the country or dinnerware. It might not be optimal to enhance the weight of an expert associated with the tag "China" when questions about dinnerware are answered when the expert only has expertise regarding the country of China. However, associating a weight with a path between an expertise cloud including "China" and a question about Chinese foreign policy would serve to decrease the ambiguity of the term "China" in the expertise cloud and increase the likelihood that questions regarding the country China would be directed to this expert.

Accumulated topical performance feedback can be also incorporated into the overall performance metric of an expert. For example, an expert who is consistently poorly rated for all topics observed may not be a promising candidate to provide a response for a newly asked question and a weight or reputation weight associated with the expert may be adjusted accordingly so that the poorly rated expert is unlikely to be transmitted to a user as an expert capable of answering a received question.

Exemplary network performance feedback may include an indication of a preference by one or more users for a particular expert to answer questions regarding a particular topic. For example, a user may select or enter "NASA" as a preferred expert to answer questions regarding the space exploration program of the United States or images generated by the Hubble Telescope.

In some cases, a user and an expert may develop a relationship, especially when the user and expert share common interests and "conversations" between the user and the expert develop. These conversations may include follow-up questions, clarifications, and other exchanges of information between the user and the expert.

In some embodiments, a user may be enabled to establish a preference for certain expert(s) he has developed a relationship with, as a "fan," for example, to answer questions he asks. A user may select a preferred expert or one may be selected for the user based on, for example, the user's feedback, the feedback of other users, and/or another appropriate criteria. In such a case, the preferred expert may be assigned a higher weight such that questions from that user are preferentially directed to a preferred expert when it is qualified to answer the asked question. In one embodiment, a matrix of fan-to-expert weights may be generated using network performance feed back. This matrix may then be used when matching experts to questions. The matrix may be generated by, for example, expert feedback machine 137 and stored in, for example, feedback database 188.

Figure 13:
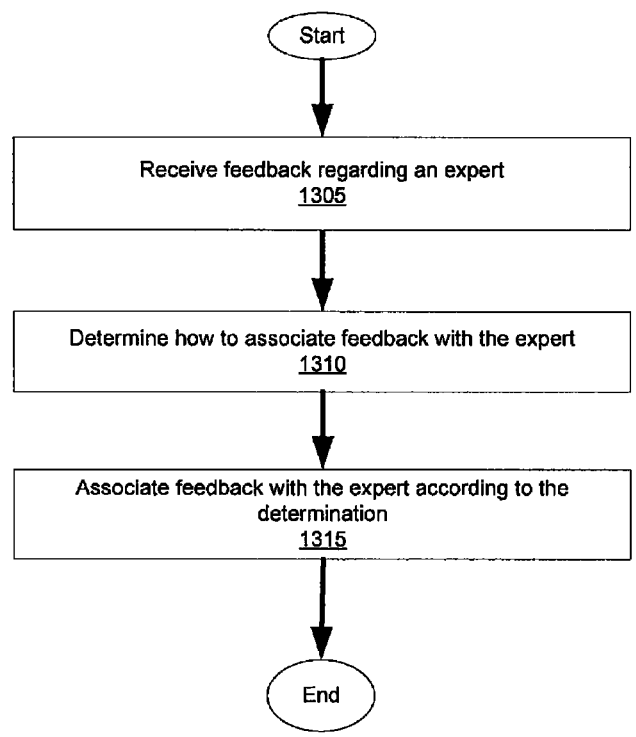
FIG. 13 is a flow chart illustrating an exemplary process for associating feedback with an expert, in accordance with an embodiment of the present invention.

FIG. 13 illustrates an exemplary process 1300 for associating feedback with an expert. Process 1300 may be executed by, for example, systems 100, 200, 300, and/or any combination thereof.

In step 1305, feedback regarding an expert may be received. The feedback may be received from, for example, a user or entity that submits a question, a fan-to-expert matrix, an expert monitor, like expert monitor 186, that tracks expert performance, response times, and/or question answering thoroughness, and/or any combination thereof.

In step 1310, it may be determined how the received feedback is to be associated with the expert. For example, overall performance feedback may be associated with the expert, topical performance may be associated with, for example, the expert, one or more expertise tags associated with the expert, and/or one or more expertise clouds associated with the expert. Network performance may be associated with, for example, the expert, one or more expertise tags associated with the expert, one or more expertise clouds associated with the expert, and/or a user-to-expert matrix.

In step 1315, received feedback may be associated with the expert according to the determination of step 1310. Step 1315 may include associating a weight or score with, for example, the expert, one or more expertise tags associated with the expert, one or more expertise clouds associated with the expert, and/or a user-to-expert matrix. Following step 1315, process 1300 may end.

In one embodiment, a user may desire to find an expert associated with a particular topic and in another embodiment, expert may desire to find another expert with similar and/or varied expertise. Lists of one or more experts associated with a requested topic may be generated by, for example, matching expertise tags and/or expertise clouds among experts associated with the desired areas of expertise.

In some embodiments, the strength of an expert's association with a topic and/or a degree of similarity between two or more experts may be determined by, for example, using a process for matching a question and an expert similar to processes 900 and 1100 as discussed above with regard to FIGS. 9 and 11. In one embodiment, the number of relationships between two or more experts, and/or the strength of the relationships may be determined such that, for example, an exact expertise-expertise match and/or an exact requested expertise-expertise match may have a very strong tag-cloud relationship score, analagous to using a value of 1 for both Q and T in equation 1.

Table 13 below includes expertise tags associated with Experts 2-8, who have one or more areas of expertise in common with an Expert 1, the relevant expertise tags associated with Expert 1, and relative similarity scores between Expert 1 and Experts 2-8, respectively, calculated via a method analogous to the tag cloud score calculation. In this example, a score premium is placed on multiple matches, and on exact matches between Expert 1 and Experts 2-8, respectively. In some cases, synonyms may be treated as exact matches even when the exact language used to describe the area of expertise is not exactly the same. For example, Indian cuisine may be treated as synonymous with Indian food and therefore two experts that are associated with expertise in Indian food and Indian cuisine, respectively, may be considered to have matching expertise. In some cases multiple synonymous matches may not be filtered out and/or awarded extra weight. In this way, exact matches of expertise tags between experts may not necessarily dominate over synonymous matches between experts.

In the example provided in Table 13, Expert 1 is associated with the expertise tags of camping, curry recipes, Indian cuisine, New Delhi, Bollywood, Bollywood music, Bollywood movies, and wines. The expertise tags of Expert 1 that are relevant to Experts 2-8 are listed under the "Expert 1's Tags" column and the expertise tags of Experts 2-8 that are relevant to Expert 1's tags are listed under the "Related Tags" column. The "Similarity Score" column lists a score indicative of a degree of similarity between Expert 1 and Experts 2-8, respectively, wherein a relatively high score indicates a relatively high level of similarity between the experts.

TABLE 13

| Expert | Similarity Score | Expert 1's Tags | Related Tags |
|---|---|---|---|
| Expert 2 | 0.073 | camping | camping |
|  |  | curry recipes | curry |
|  |  | Indian cuisine | Indian food |
| Expert 3 | 0.058 | camping | camping |
|  |  | New Delhi | New Delhi |
|  |  |  | India |
| Expert 4 | 0.057 | Bollywood | Bollywood |
|  |  | Indian cuisine | Indian food |
|  |  | Bollywood music | Bollywood |
|  |  | Bollywood movies | Bollywood |
| Expert 5 | 0.048 | camping | camping |
| Expert 7 | 0.007 | Indian cuisine | Indian food |
| Expert 8 | 0.005 | wines | California wines |

Figure 14:
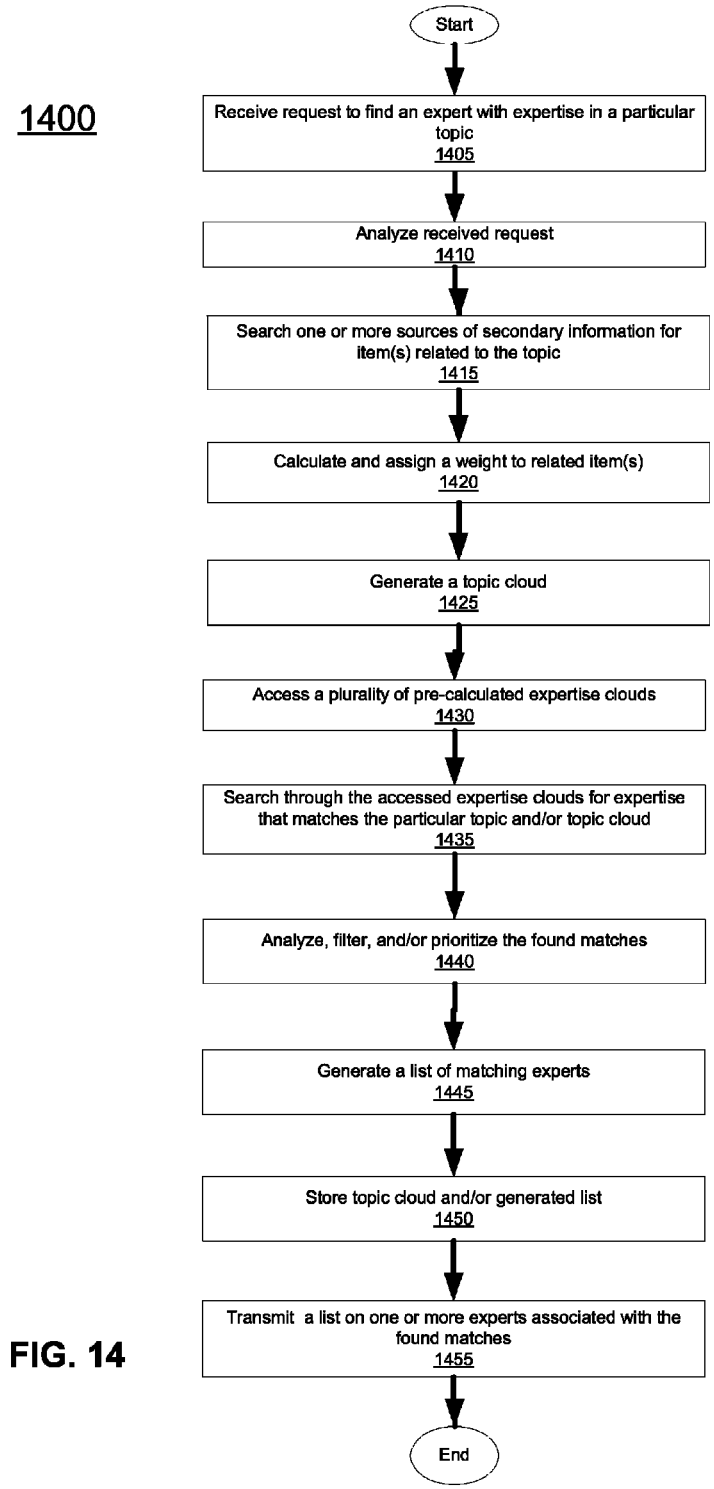
FIG. 14 is a flow chart illustrating an exemplary process for matching an expert with a requested topic, in accordance with an embodiment of the present invention.

FIG. 14 depicts an exemplary process 1400 for locating at least one expert with expertise in a particular topic. Process 1400 may be executed by, for example, systems 100, 200, 300, and/or any combination thereof.

Figure 15:
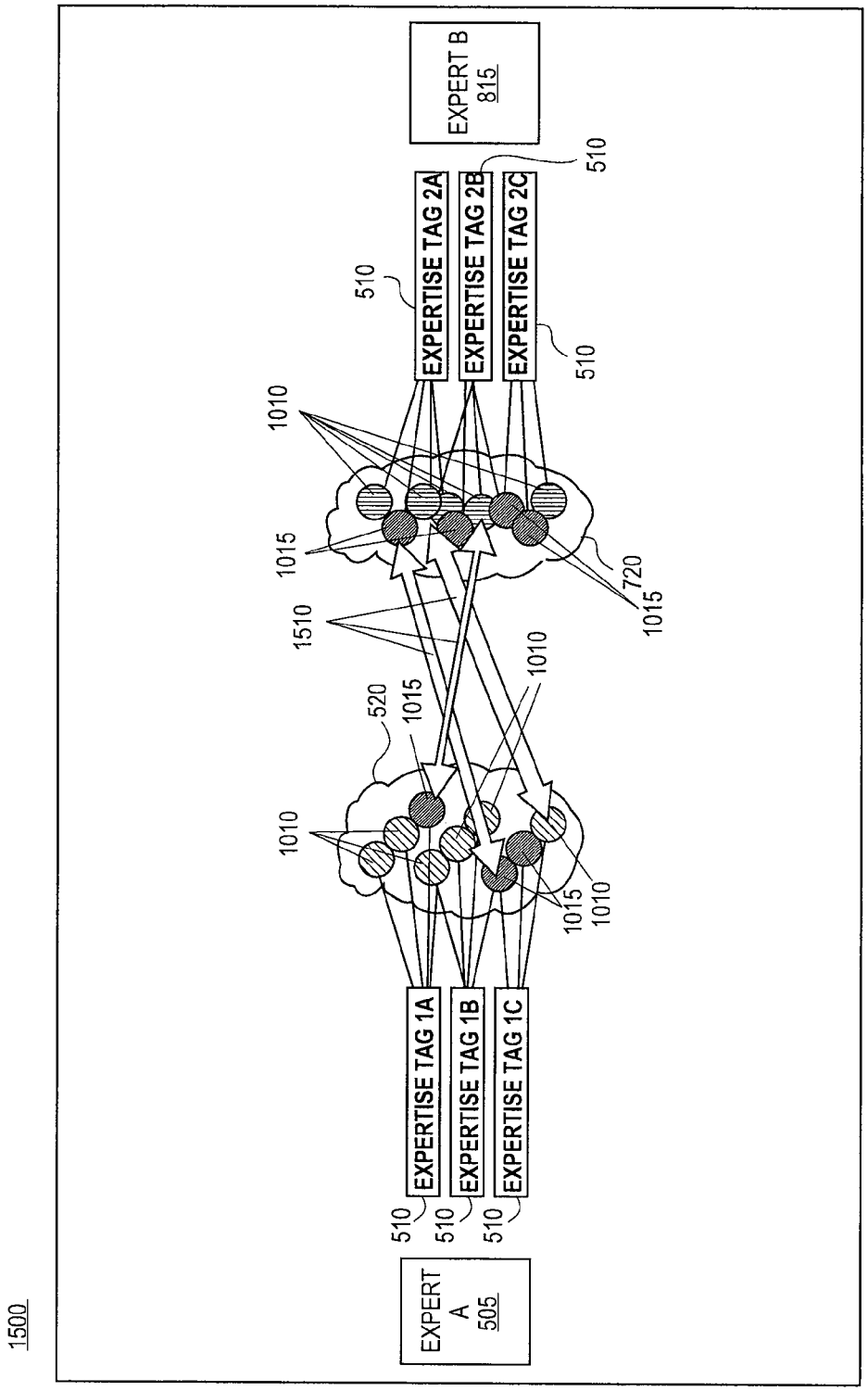
FIG. 15 is a diagram illustrating an exemplary graphic depiction of matching two experts with related areas of expertise, in accordance with an embodiment of the present invention.

FIG. 15 is a graphic depiction of the process of matching two experts such as process 1400. For ease of understanding, FIGS. 14 and 15 will be discussed together. In some embodiments, process 1400 may be used to match experts that share related concepts of expertise such as related items 1015.

In step 1405, a request to find an expert with expertise associated with a particular topic and/or concept may be received by, for example, question and expert matching system 120. The request may be received from, for example, a user and/or another expert, such as expert A 505 or expert B 815.

In step 1410, the received request may be analyzed in order to, for example, understand or recognize the particular topic and/or determine one or more criteria for searching through a plurality of pre-calculated expertise clouds in order to locate an expert with expertise matching the requested expertise. In some cases, the analysis of step 1410 may include decomposing the requested topic into one or more components. This decomposition may be similar to the determination of components included in a question as discussed above with regard to FIG. 6.

In step 1415, one or more sources of secondary information may be searched for information relating to the topic. Such related information may be referred to herein as a "related item." Exemplary sources of secondary information include search engine log data, reference data, and editorial data, such as search engine log data 140, reference data 150, and editorial data 155, respectively.

Once found, related items may be analyzed and/or mathematically manipulated in order to, for example, determine the related item's relevancy to an area of expertise and/or popularity among, for example, search engine users. Popular related items may include terms or concepts that are, for example, frequently used to describe an area of expertise, are frequently asked about via user submitted queries and/or are frequently selected as a pick by, for example, search engine users.

In some cases, related items may be weighted (step 1420) according to one or more criteria, such as relevancy and/or popularity, such that information that is strongly related to an expertise tag may be weighted higher than other information that is relatively weakly related to the expertise tag. Likewise, related items that are relatively more popular may be weighted more highly than relatively unpopular related items. In step 1425, a topic cloud may be generated using, for example the related items and the weights assigned to the related items. Execution of step 1425 may resemble, for example, the execution of steps 445 and 640 as discussed above with reference to FIGS. 4 and 6, respectively.

In step 1430, a plurality of pre-calculated expertise clouds, like expertise cloud A 520 and expertise cloud B 825 may be accessed by, for example, question/expert matching engine 130. The pre-calculated expertise clouds may be stored in stored in, for example, storage 170 and/or expertise cloud database 174. The accessed pre-calculated expertise clouds may be searched through in order to locate one or more experts associated with expertise, expertise tags, and/or related items that match the particular topic and/or topic cloud (step 1435). Matching related items and expertise tags shared between expert A 505 and expert B 815 are shown as related items 1015 in FIG. 15 while unmatching related items shared between expert A 505 and expert B 815 are shown as related items 1010 in FIG. 15. The paths between matching related items 1015 are depicted in FIG. 15 as arrows 1510 wherein the relative width of the arrow indicates the relative strength, or weight, associated with the path.

In step 1440, the found matches may be analyzed, filtered, and/or prioritized according to one or more criteria. Step 1440 may resemble step 930 as discussed above with regard to FIG. 9. In step 1445, a list of experts associated with the found matches may be generated using, for example, the analyzed, filtered, and/or prioritized results of step 1435. In step 1450, the generated list and/or topic cloud may be stored in, for example, storage 170 and/or found expertise matches database 184. In step 1455, the generated list may be transmitted via, for example, network 110 to the requester. Following step 1455, process 900 may end.

Figure 16A:
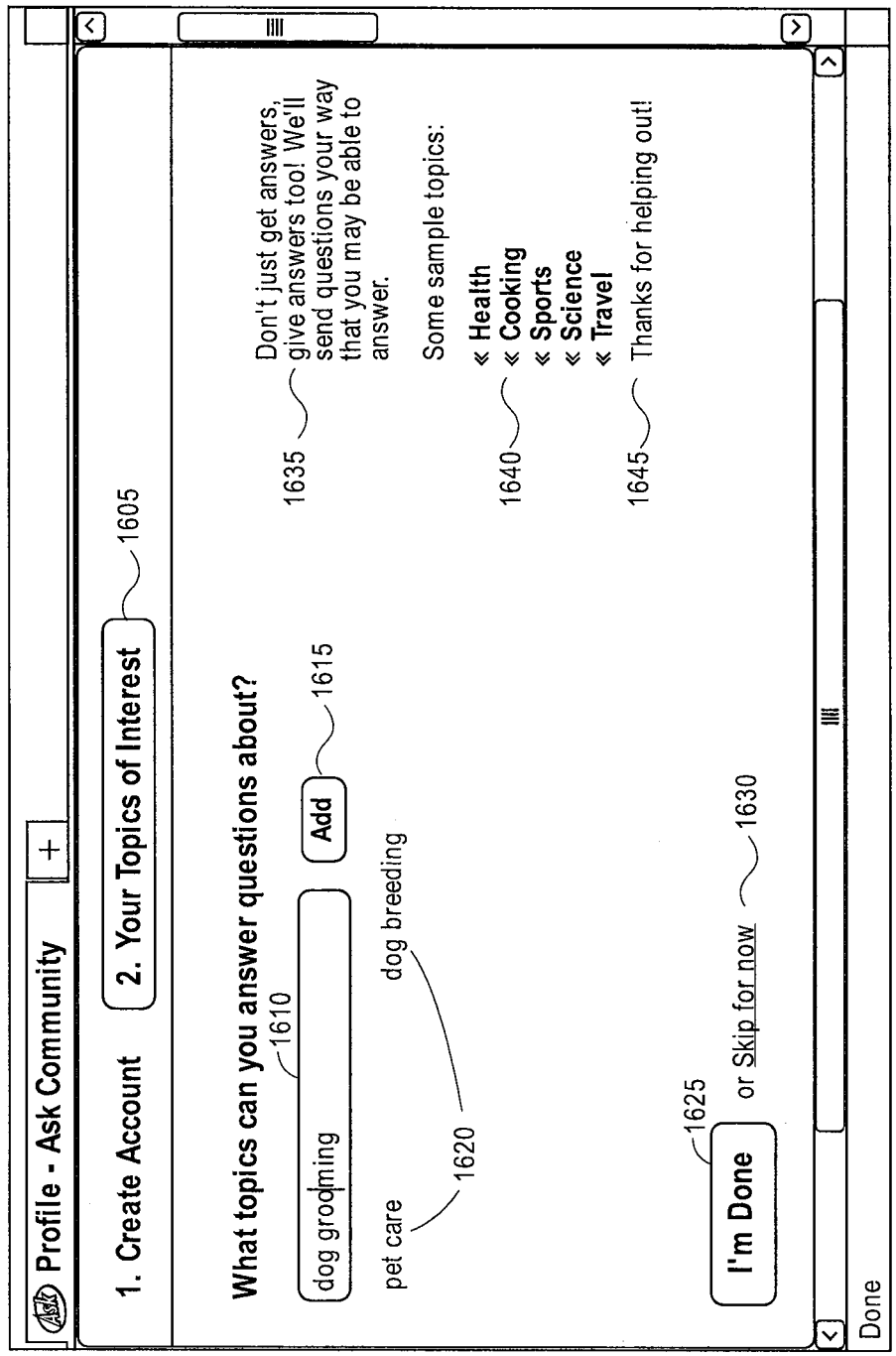
FIGS. 16A and B are screen shots of exemplary graphic user interfaces (GUI), in accordance with an embodiment of the present invention.

FIG. 16A is a screenshot of an exemplary GUI page 1600 that enables an expert to enter information regarding his expertise and topics he can, or would like to, answer questions about. GUI 1600 may be provided to the expert via, for example, systems 100 and/or 200 and/or via a user computer system, such as user computer system 105. GUI 1600 may be displayed to the expert via, for example, a computer monitor or a video display such as video display 335. GUI 1600 may be displayed to the expert via a web or Internet browser via, for example, one or more networks such as networks 110, remote sites 215, user computer systems 105, and/or server system 210. GUI 1600 may be used to enable execution of one or more methods described herein such as, but not limited to, methods 400, 600, 1300, and 1400 as discussed above with regard to FIGS. 4, 6, 13, and 14, respectively.

Information entered via GUI 1600 may be used by, for example, systems 100, 200, and/or 105 for associating one or more expertise tags with an expert, creating an expertise profile, associating an expertise profile with expert, creating an expertise cloud, and/or associating an expertise cloud with the expert.

GUI 1600 may include a menu bar 1605. Menu bar 1605 may include one or more options that, when selected, enable the expert to enter information regarding, for example, his area(s) of expertise. For example, menu bar 1605 displays a "Create Account" selectable option and a "Your Topics of Interest" selectable option. GUI 1600 may be displayed following the selection of the "Your Topics of Interest" selectable option. GUI 1600 may also include one or more dialogue boxes 1610 in which the expert may enter areas of expertise or topics that he can, or would like to, answer questions about. The expert may add this topic and/or area of expertise to their expertise profile by selecting an "Add" selectable option 1615.

GUI 1600 may also include a list 1620 of previously entered topics or areas of expertise. For example, list 1620 includes "pet care" and "dog breeding" as areas of expertise associated with the expert entering information into GUI 1600. GUI 1600 may further include a message 1635. Message 1635 may include one or more messages to the expert regarding, for example, the entry of the expert's information via GUI 1600, the status of his expertise profile, and/or any other message provided by an administrator or manager of GUI 1600.

GUI 1600 may also include a list of selectable sample topics 1640. The sample topics included in list 1640 may be a generic list sample topics, a list of popular sample topics, and/or sample topics specifically targeted to the expert using GUI 1600 based on, for example, information entered via GUI 1600. GUI 1600 may also include a message 1645. Message 1645 may be similar to message 1635 and may, for example, say thanks for helping out to the expert. Finally, GUI 1600 may include an "I'm Done" selectable option 1625 and/or a "Skip for Now" selectable option 1630. Selection of "I'm Done" selectable option 1625 may initiate the conclusion of the expert's entry of information via GUI 1600. Selection of "Skip For Now" selectable option 1630 may enable the expert to skip entry of information into GUI 1600, entry of information into GUI 1600 and/or forward a user to, for example, another GUI page.

Figure 16B:
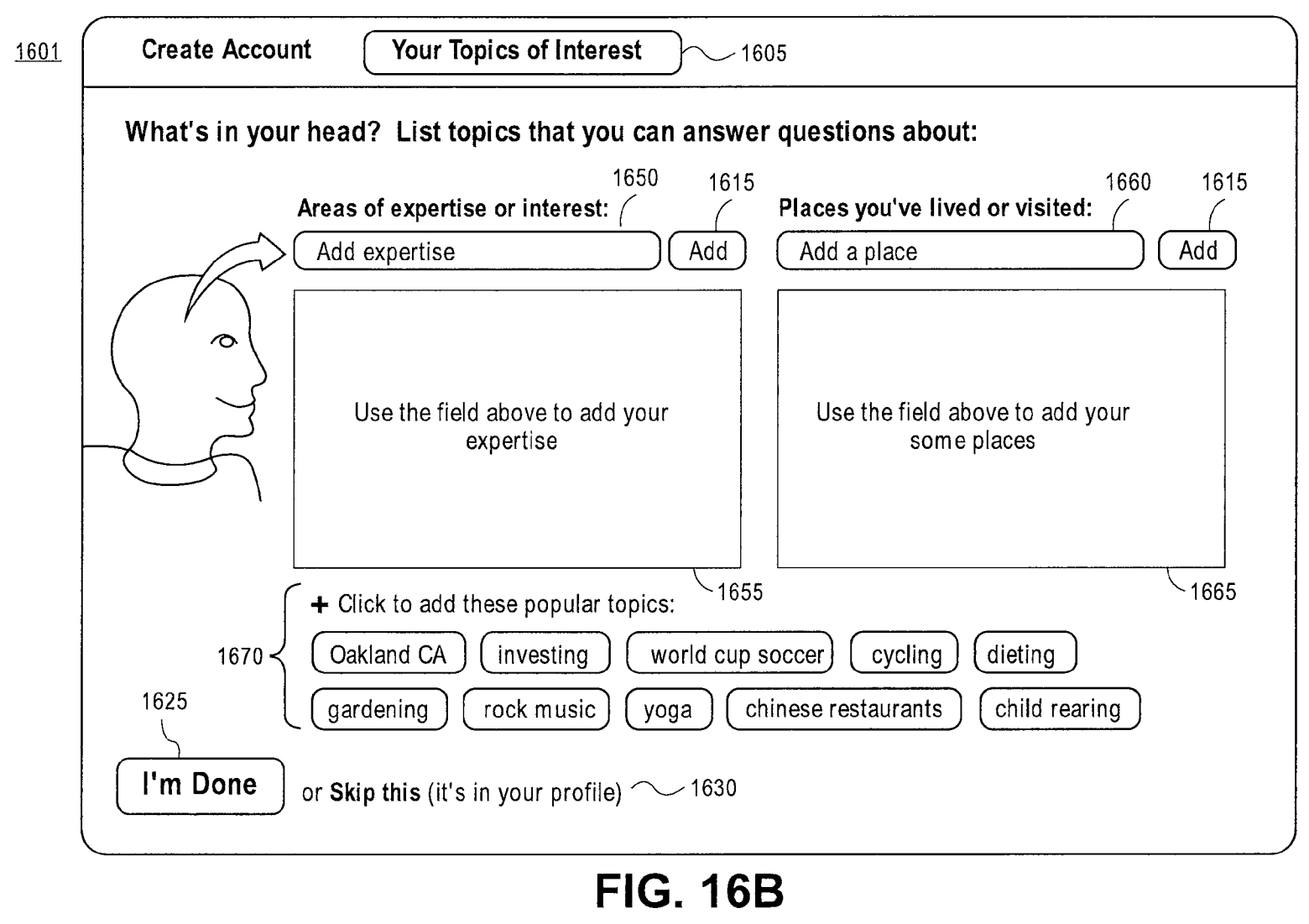

FIG. 16B is a screenshot of an exemplary GUI page 1601 for enabling an expert to enter information regarding one or more areas of expertise or interests to be associated with the expert. GUI 1601 may be provided to the expert via, for example, systems 100 and/or 200 and/or via a user computer system, such as user computer system 105. GUI 1601 may be displayed to the expert via, for example, a computer monitor or a video display, such as video display 335. In some embodiments, GUI 1601 may be displayed to the expert via a web or Internet browser via, for example, one or more networks such as network 110, remote site 215, user computer system 105, and/or server system 210. GUI 1601 may be used to enable execution of one or more methods described herein such as, but not limited to, methods 400, 600, 1300, and 1400 as discussed above with regard to FIGS. 4, 6, 13, and 14, respectively.

Information entered via GUI 1601 may be used to, for example, create and/or update an expert profile and/or an expertise cloud associated with the expert entering the information. Information entered via GUI 1601 may also be used to associate one or more expertise tags with the expert.

GUI 1601 may include menu bar 1605 and a dialog box 1650 in which an expert may enter information regarding his one or more areas of expertise. The expert may execute the adding of the entered area of expertise to his expertise profile by selecting "Add" selectable option 1615. Likewise, the expert may enter one or more places he has lived or visited via a dialog box 1660 and may add the place they have lived or visited to his expertise profile via selection of "Add" selectable option 1615. Information entered into dialog boxes 1650 and 1660 and thereafter added via selection of "Add" selectable option 1615 may be used to determine and/or associate one or more expertise tags with an expert, generate and/or update an expertise profile associated with the expert, and/or generate and/or update one or more expertise clouds associated with the expert.

Box 1655 may display one or more instructions for the entry of information into dialog box 1650. Likewise, box 1665 may display one or more instructions for the entry of information into dialog box 1660. GUI 1601 may further include a list of one or more popular topics 1670 or topics selected for the expert based on information entered via GUI 1601. List of popular topics 1670 may include one or more selectable options that may be selected and/or "clicked" upon in order to add a selected topic to an expert's profile. For example, selection of the Oakland, California popular topic may add Oakland, California to the expert's profile, expertise cloud and/or list of expertise tags. When the expert is finished entering information via GUI 1601, the expert may select "I'm Done" selectable option 1625 to, for example, conclude his session with GUI 1601 and/or advance his interaction with the program providing GUI 1601 to a new screen or GUI page. The expert's selection of "Skip This" option 1630 may, for example, exit the expert from GUI 1601, advance him to a new GUI page, or terminate his expert information entry session.

Figure 17:
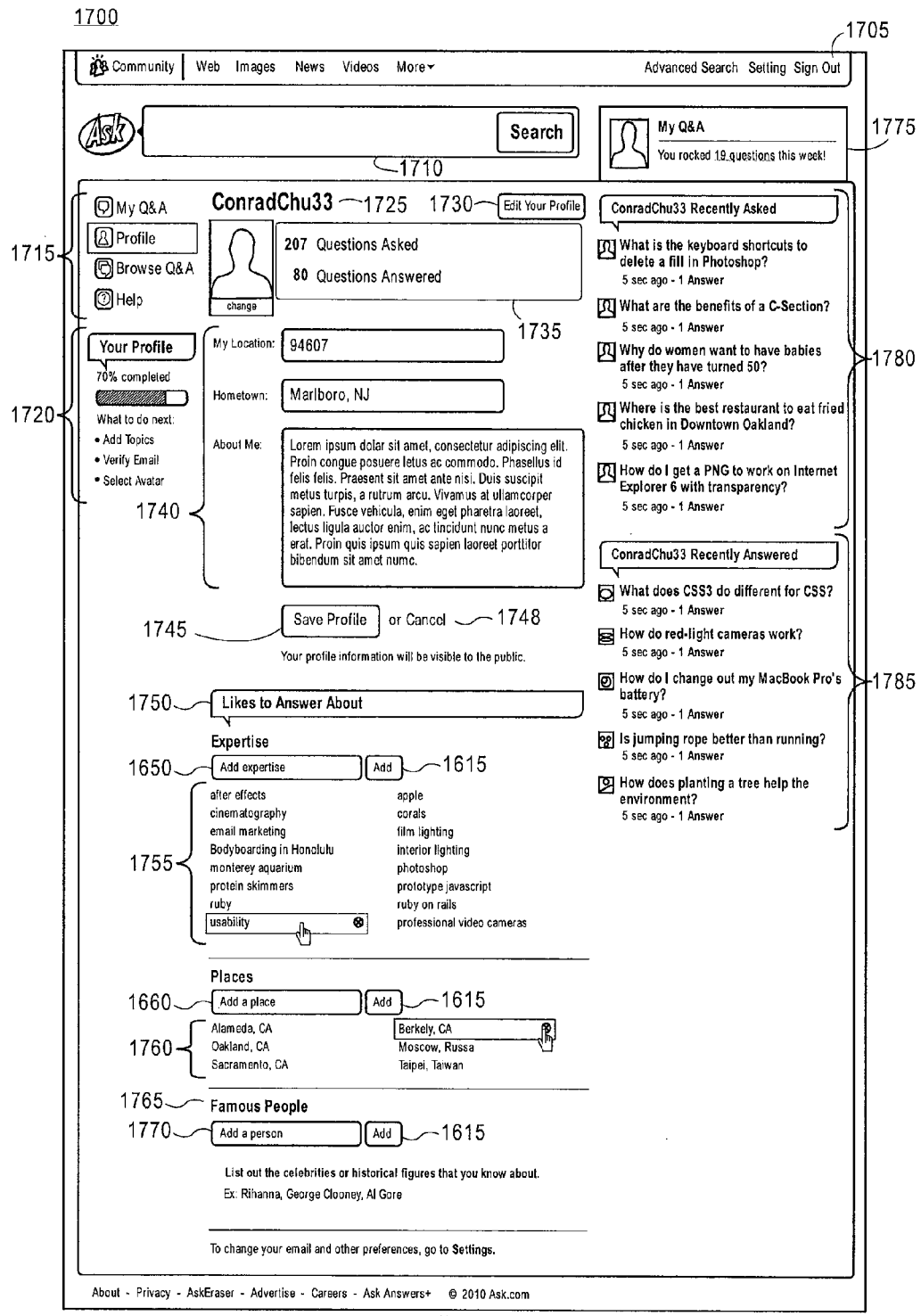
FIG. 17 is a screen shot of an exemplary GUI, in accordance with an embodiment of the present invention.

FIG. 17 is a screenshot of an exemplary GUI page 1700 that includes an exemplary expertise profile associated with an expert. The expertise profile shown in GUI 1700 may include and/or be associated with one or more expertise tags and/or expertise clouds associated with an expert. GUI 1700 may be provided to the expert via, for example, systems 100 and/or 200 and/or via a user computer system, such as user computer system 105. GUI 1700 may be displayed to the expert via, for example, a computer monitor or a video display, such as video display 335. In some embodiments, GUI 1700 may be displayed to the expert via a web or Internet browser via, for example, one or more networks such as network 110, remote site 215, user computer system 105, and/or server system 210. GUI 1700 may be used to enable execution of one or more methods described herein such as, but not limited to, methods 400, 600, 1300, and 1400 as discussed above with regard to FIGS. 4, 6, 13, and 14, respectively.

GUI 1700 may include a list of menu options 1705. Menu options 1705 may include various selectable options for an expert that, when selected, enable, for example, the change of a setting of GUI 1700, an advanced Internet search, and/or a signing out of a GUI page. GUI 1700 may also include a dialog box 1710 and a "Search" selectable option associated with dialog box 1710 wherein entry of one or more terms or key words in dialog box 1710 and selection of "Search" selectable option associated with dialog box 1710 may initiate an Internet search related to the keywords or terms entered into dialog box 1710.

GUI 1700 may also include a list of profile options 1715. The profile options included in list 1715 may relate to, for example, the expert's profile or level of activity, a quantity of questions submitted to the expert, and a quantity of answers provided by the expert. List 1715 may also include a selectable option wherein selection of the option enables the expert to browse recently posted questions and answers. List 1715 may further include a selectable help option.

GUI 1700 may further include a status menu 1720 regarding the status of the expert's profile and/or expertise clouds associated with the profile. For example, status menu 1720 may include a percentage of an expertise profile completed and a listing of one or more areas of a profile to be completed.

GUI 1700 may further include an expert's name or user name 1725 such as "ConradChu33" and an image, photograph, and/or avatar associated with an expert. GUI 1700 may also include a listing 1735 of the number of questions asked of the expert and/or the number of questions answered by the expert.

The expert may edit and/or revise their profile via selection of an "Edit Your Profile" selectable option 1730. Selection of "Edit Your Profile" selectable option 1730 may enable an expert to access, for example, GUIs 1600 and/or 1601 via which he may, directly or indirectly, generate, edit, revise, or update his profile, expertise tags, and/or expertise clouds associated with his profile.

GUI 1700 may further include profile information 1740. Profile information 1740 may include, for example, location information, hometown information and personal information associated with the expert. An expert may save his profile via selection of a "Save Profile" selectable option 1745 or may cancel the creation of a profile and/or an updating of a profile via selection of "Cancel" selectable option 1748.

GUI 1700 may include a listing 1750 of areas or topics of expertise an expert can, or would like to, answer questions about. An expert may update a listing of areas of expertise such as listing 1755 via entering an area of expertise via dialog box 1650 and selecting "Add" selectable option 1615. Likewise the expert may add a place to a list of places associated with the expert such as list 1760 via entry of a place into dialog box 1660 and selection of "Add" selectable option 1615. An expert may further add one or more people that they have an interest in and/or expertise about under a famous people heading 1765 via entry of a famous person's name into dialog box 1770 and selection of "Add" selectable option 1615.

GUI 1700 may also include a tally 1775 of questions answered by the expert during a given time period, such as a week, and a list 1780 of questions recently asked to an expert. List 1780 may include, for example, one or more questions that were asked of the expert, how long ago a question was asked, and/or how many answers to a question were received.

Finally, GUI 1700 may include a list 1785 of questions recently answered. List 1785 may include one or more questions the expert answered and/or one or more icons associated with a recently answered question. The recently asked questions included in list 1780 and the recently answered questions included in list 1785 may all be selectable by the expert such that selection of one or more of the recently asked questions and/or recently answered questions may initiate a display of further information regarding the selected question and/or answer.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

We claim:

1. A method comprising:
   receiving information regarding a plurality of experts at a question and expert matching system;
   storing, by the question and expert matching system, a plurality of expertise tags associated with each one of the respective experts;
   determining, by the question and expert matching system, a plurality of related items for each expert tag by comparing the expertise tag with related items for the expertise tags in a database of related items;
   generating, by the question and expert matching system, an expertise cloud for each expert of the plurality using the received information of experts, wherein the expertise cloud comprises the related items corresponding to the expertise tags for the expert and the expertise cloud is weighted based on a relative importance of each expertise tag;
   receiving, by the question and expert matching system, a question from a user;
   generating a plurality of related items associated with the question;
   generating, by the question and expert matching system, a question cloud for the question, wherein the question cloud comprises the related items corresponding to the question and the question cloud is weighted based on a relative importance of the related items of the question;
   searching, by the question and expert matching system, for one or more expertise clouds matching the question cloud by determining, by the question and expert matching system, weighted matches between the related items of the question clouds and the related items of the expertise clouds to find expertise clouds associated with the one or more related items in the question cloud to derive a respective question-component-to-expertise-tag-path score $S_{QRT}$ between each expertise cloud and the question cloud;
   determining, by the question and expert matching system, experts associated with the found matching expertise clouds by generating a list of ranked matching expertise clouds based on the $S_{QRT}$ of the found expertise clouds based on whether an expertise cloud has a threshold degree of relevancy to a question cloud; and
   routing, by the question and expert matching system, the question to an expert associated with a matching expertise cloud included in the list of ranked matching expertise clouds.

2. The method of claim 1, further comprising:
   accessing, by the question and expert matching system, a database storing a plurality of pre-generated expertise clouds; and
   searching, by the question and expert matching system, for one or more of the pre-generated expertise clouds matching the question cloud.

3. The method of claim 1, wherein the generation of the expertise clouds comprises:
   analyzing, by the question and expert matching system, the received information regarding an expert included in the plurality of experts;
   determining, by the question and expert matching system, one or more expertise tags related to the received information based on the analysis;
   associating, by the question and expert matching system, the expertise tags with the expert;
   searching, by the question and expert matching system, one or more secondary sources of information for one or more items related to the expertise tags associated with the expert; and
   updating, by the question and expert matching system, the expertise cloud associated with the expert to incorporate the one or more expertise tags and related items.

4. The method of claim 3, further comprising:
   calculating, by the question and expert matching system, a weight for at least one of the one or more expertise tags and the one or more related items;
   assigning, by the question and expert matching system, the calculated weight to the at least one expertise tag and related item; and
   updating, by the question and expert matching system, the expertise cloud associated with the expert to incorporate the assigned weight.

5. The method of claim 3, wherein the secondary sources of information include at least one of search engine log data, reference data, editorial data, expert data, and expertise tag data.

6. The method of claim 1, wherein the generation of a question cloud comprises:
   analyzing, by the question and expert matching system, the question;
   determining, by the question and expert matching system, one or more components included in the question;
   searching, by the question and expert matching system, one or more secondary sources of information for one or more items related to the one or more components; and
   updating, by the question and expert matching system, the question cloud to incorporate the one or more components and related items.

7. The method of claim 6, further comprising:
   calculating, by the question and expert matching system, a weight for at least one of the one or more components and the one or more related items;
   assigning, by the question and expert matching system, the calculated weight to the at least one component and related item; and
   updating, by the question and expert matching system, the expertise cloud to incorporate the assigned weight.

8. The method of claim 1, further comprising:
   receiving, by the question and expert matching system, feedback regarding an expert included in the plurality of experts;

analyzing, by the question and expert matching system, the received feedback; and associating, by the question and expert matching system, the received feedback with at least one of the expert and an expertise cloud associated with the expert, based on the analysis.

9. The method of claim 1, wherein the searching is based upon one or more weighted conceptual relationships between an expertise cloud and a question cloud.

10. The method of claim 1, wherein the analysis includes:
determining, by the question and expert matching system, a number of independent paths between the question cloud and a matching expertise cloud, wherein each independent path is associated with a weight;
analyzing, by the question and expert matching system, the weight associated with each independent path; and
determining, by the question and expert matching system, the size of the matching expertise cloud.

11. The method of claim 1, wherein a portion of the information relating to the expert is provided by the expert, the method further comprising:
requesting, by the question and expert matching system, additional information from the expert;
receiving, by the question and expert matching system, the additional information from the expert in response to the request; and
updating, by the question and expert matching system, the expertise cloud associated with the expert to include the additional information.

12. A non-transitory machine-readable medium, the machine-readable medium including a set of instructions executable by a machine which when executed cause the machine to perform the following method:
receive information regarding a plurality of experts;
store a plurality of expertise tags associated with each one of the respective experts;
determine a plurality of related items for each expert tag by comparing the expertise tag with related items for the expertise tags in a database of related items;
generate an expertise cloud for each expert of the plurality using the received information of experts, wherein the expertise cloud comprises the related items corresponding to the expertise tags for the expert and the expertise cloud is weighted based on a relative importance of each expertise tag;
receive a question from a user;
generate a plurality of related items associated with the question;
generate a question cloud for the question, wherein the question cloud comprises the related items corresponding to the question and the question cloud is weighted based on a relative importance of the related items of the question;
search for one or more matches between the expertise clouds and the question cloud by determining, by the question and expert matching system, weighted matches between the related items of the question clouds and the related items of the expertise clouds to find expertise clouds associated with the one or more related items in the question cloud to derive a respective question-component-to-expertise-tag-path score $S_{QRT}$ between each expertise cloud and the question cloud;
determine experts associated with the found matching expertise clouds by generating a list of ranked matching expertise clouds based on the $S_{QRT}$ of the found expertise clouds based on whether an expertise cloud has a threshold degree of relevancy to a question cloud; and
route the question to an expert associated with a matching expertise cloud included in the list of ranked matching expertise clouds.

13. A system comprising:

a processor;

a computer-readable medium connected to the processor; and a set of instructions on the computer-readable medium and executable by the processor, including:

a question and expert matching system for receiving information regarding a plurality of experts, storing a plurality of expertise tags associated with each one of the respective experts, determining a plurality of related items for each expertise tag with related items for the expertise tags in a database of related items, generating an expertise cloud for each expert of the plurality using the received information of experts, wherein the expertise cloud comprises the related items corresponding to the expertise tags for the expert and the expertise cloud is weighted based on a relative importance of each expertise tag, receiving a question from a user, generating a question cloud for the question, generating a plurality of related items associated with the question, generating a question cloud for the question, wherein the question cloud comprises the related items corresponding to the question and the question cloud is weighted based on a relative importance of the related items of the question, searching for one or more matches between the expertise clouds matching the question cloud, by determining weighted matches between the related items of the question clouds and the related items of the expertise clouds to find expertise clouds associated with the one or more related items in the question cloud to derive a respective question-component-to-expertise-tag-path score $S_{QRT}$ between each expertise cloud and the question cloud, determining experts associated with the found matching expertise clouds by generating a list of ranked matching expertise clouds based on the $S_{QRT}$ of the found expertise clouds based on whether an expertise cloud has a threshold degree of relevancy to a question cloud, and routing the question to an expert associated with a matching expertise cloud included in the list of ranked matching pre-calculated expertise clouds; and a database for storing at least one of the generated question cloud and expertise clouds.

14. The method of claim 1, wherein the question cloud is weighted based on a relative size of the components for the question.

15. The method of claim 1, wherein the question cloud is weighted based on a relative strength of the related items for each component.

16. The method of claim 1, wherein the database includes query-query (QQ) data, wherein $$S_{QRT} = C\left[\left(\frac{m}{R \times (D+d)}\right)\frac{(Q \times T)}{(Q+T)}\right]^E$$

where $Q=Q_R/q$, $T=T_R/t$, Q is QQ score from component to related item, T is QQ score from tag to related item, $Q_R$ is QQ score from component to related item, $T_R$ is QQ score from related item to expertise tag, q is global popularity score of component, t is global popularity score of expertise tag, R is global popularity score of related item, D is number of experts having related item in their clouds, d is count constant, C is component weight, E is path exponent, and m is magnitude constant.

17. The method of claim 1, wherein the database includes query-query-query (QQQ) data, wherein $$S_{QRT} = C\left[\left(\frac{m}{R\times(D+d)}\right)\frac{(Q\times T)}{(Q+T)}\right]^E$$

where Q=QR/q, T=$T_R$/t, Q is QP score from component to related item, T is QP score from tag to related item, $Q_R$ is QP score from component to related item, $T_R$ is QP score from related item to expertise tag, q is global popularity score of component, t is global popularity score of expertise tag, R is global popularity score of related item, D is number of experts having related item in their clouds, d is count constant, C is component weight, E is path exponent, and m is magnitude constant.

18. The method of claim 1, wherein the database includes query-pick-query (QPQ) data, wherein $$S_{QRT} = C\left[\left(\frac{m}{R\times(D+d)}\right)\frac{(Q\times T)}{(Q+T)}\right]^E$$

where $$Q = \frac{1}{r\times j}, \quad T = T_R/t,$$

Q is QP score from component to related item, T is QP score from tag to related item $T_R$ is QP score from related item to expertise tag, t is global popularity score of expertise tag, R is global popularity score of related item, D is number of experts having related item in their clouds, d is count constant, C is component weight, E is path exponent, m is magnitude constant, r is web search rank of result and j is tuning factor.

19. The method of claim 1, further comprising:

calculating a question-to-expertise-tag score $S_{QT}$, and $S_{QT}$ is $$S_{QT} = \sum_R S_{QRT}$$

where R is a global popularity score of a related item and $S_{QT}$ is question-to-expertise-tag score; and calculating a question-to-expert-score $S_{QE}$, where $S_{QE}$ is $$S_{QE} = \frac{1}{z^a}\sum_T (S_{QT})^b$$

where z is expert's cloud size, a is attenuation exponent and b is tag exponent, the experts being ranked based on the respective $S_{QE}$ scores.

* * * * *